United States Patent [19]

Woltz et al.

[11] Patent Number: 4,602,857
[45] Date of Patent: Jul. 29, 1986

[54] PANORAMIC MOTION PICTURE CAMERA AND METHOD

[75] Inventors: Robert L. Woltz, Laguna Beach; Thomas E. Brentnall, Costa Mesa, both of Calif.

[73] Assignee: James H. Carmel, Rancho Santa Fe, Calif.

[21] Appl. No.: 648,239

[22] PCT Filed: Dec. 12, 1983

[86] PCT No.: PCT/US83/01938

§ 371 Date: Jul. 30, 1984

§ 102(e) Date: Aug. 23, 1984

Related U.S. Application Data

[63] Continuation-in-part of Ser. No. 452,620, Dec. 23, 1982, abandoned.

[51] Int. Cl.$^4$ .............................................. G03B 41/00
[52] U.S. Cl. ..................................... 352/84; 352/91 C
[58] Field of Search ................. 352/44, 84, 184, 91 R, 352/91 C, 91 S, 69

[56] References Cited

U.S. PATENT DOCUMENTS

2,925,008 2/1960 Hall ........................................ 352/84
3,246,944 4/1966 Winkler ............................. 352/91 S

FOREIGN PATENT DOCUMENTS

306652 6/1915 Fed. Rep. of Germany .

Primary Examiner—Monroe H. Hayes
Attorney, Agent, or Firm—Poms, Smith, Lande & Rose

[57] ABSTRACT

A panoramic motion picture camera for continuously nonintermittently exposing a filmstrip in which a camera body assembly includes a stationary housing portion and a rotatable housing portion, the rotatable housing portion including an upper housing section and a lower housing section rotatable about an axis of rotation. Camera components including a lens means, a film gate, a main film sprocket, a film supply sprocket, and film idler spools providing a film path are enclosed within the upper housing section while a film supply reel and film take-up reel coaxially arranged and in spaced planar zones are contained within the lower housing section of the rotatable portion. Bidirectional film spools translate the filmstrip from the supply reel to the film path provided in the upper housing section and then to the film take-up reel at the lower part of the lower housing section. In the stationary housing portion motor drive means are provided for the main film sprocket, the supply and take-up reels, and the rotatable housing portion. Brake means is provided in the stationary housing portion for stopping rotation of the main film sprocket to cause relative movement of the filmstrip past the film gate of the lens means. A method of operating such a panoramic camera in which film is conserved when the camera is stopped by closing the film gate by actuation of a capping shutter, reversing the filmstrip to displace a portion of the exposed film backwardly of the film gate, and utilizing the displaced exposed film portion as a leader during the next start-up of the camera while the shutter remains closed, and opening the shutter after the displaced film portion passes the film gate. A novel film guide spool for directing a filmstrip in two directions for guiding film between two spaced planar zones.

30 Claims, 22 Drawing Figures

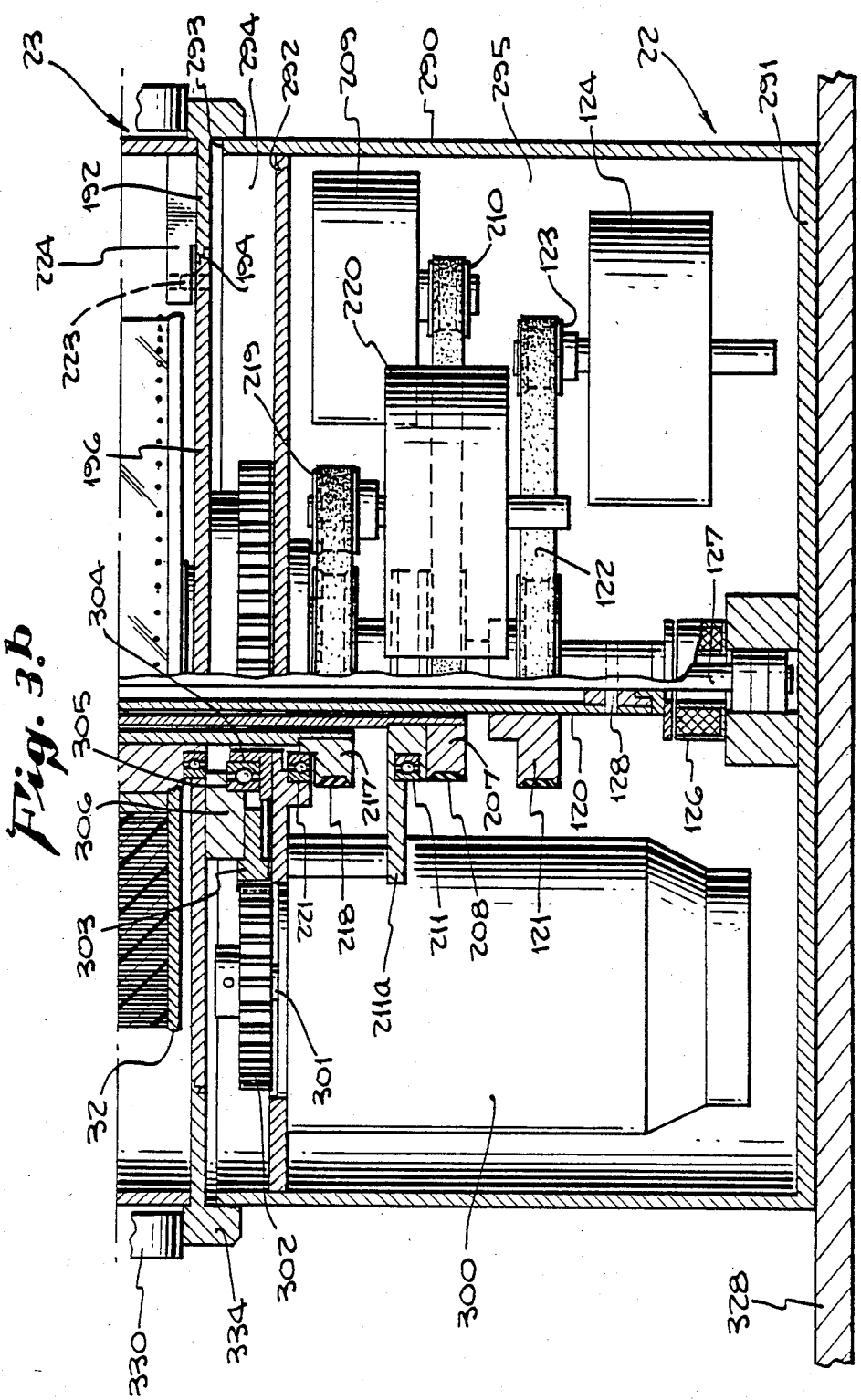
Fig. 3.b

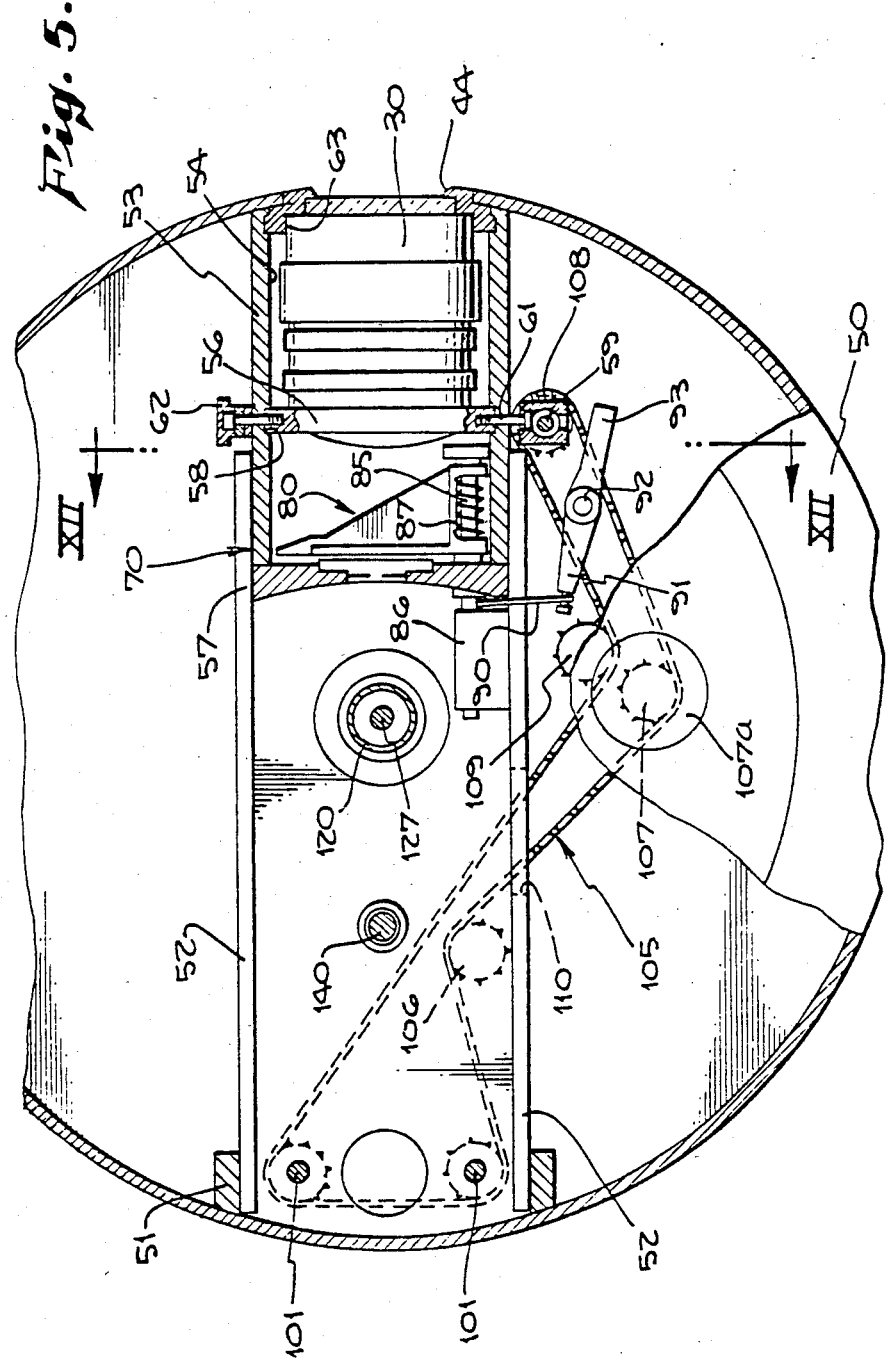

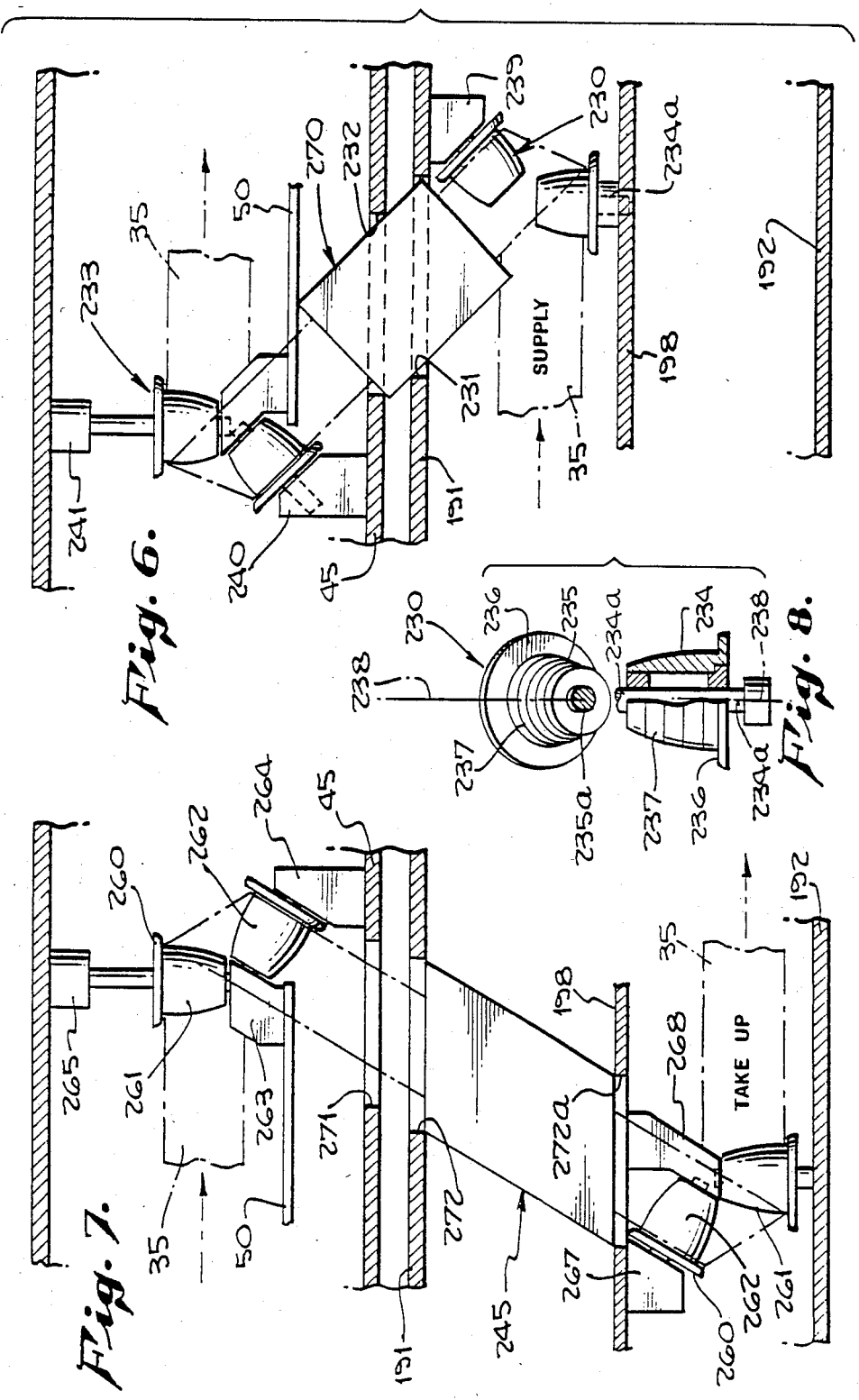

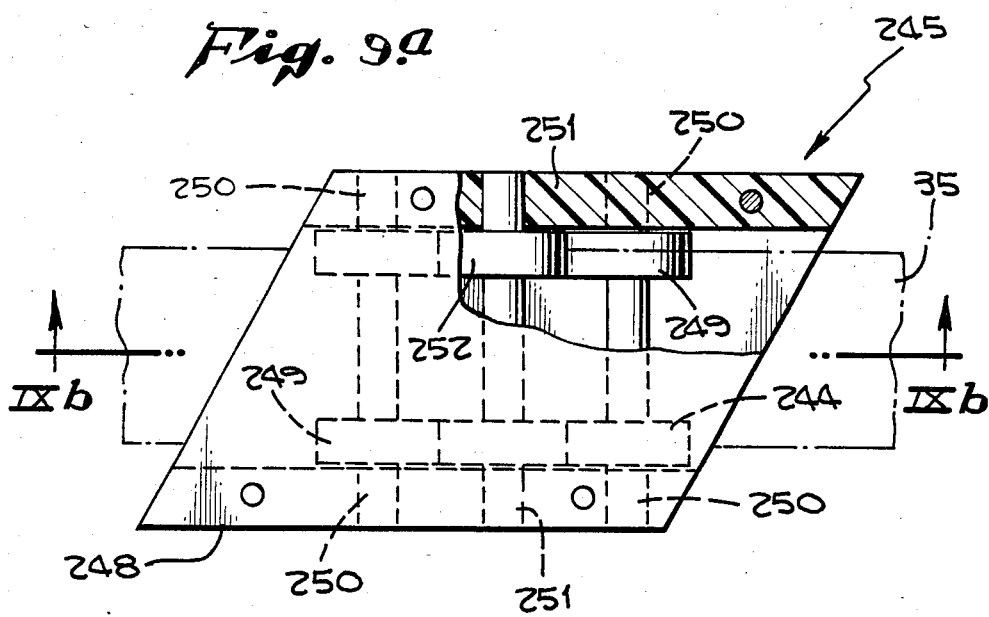
Fig. 9.a
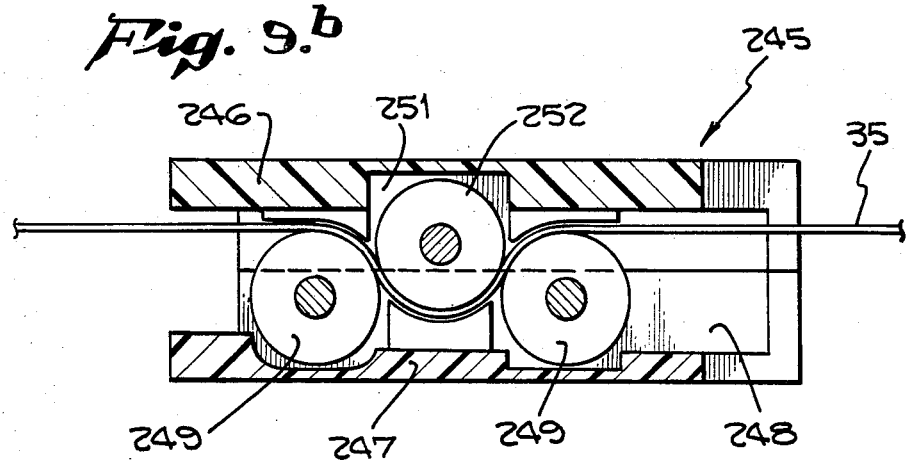
Fig. 9.b

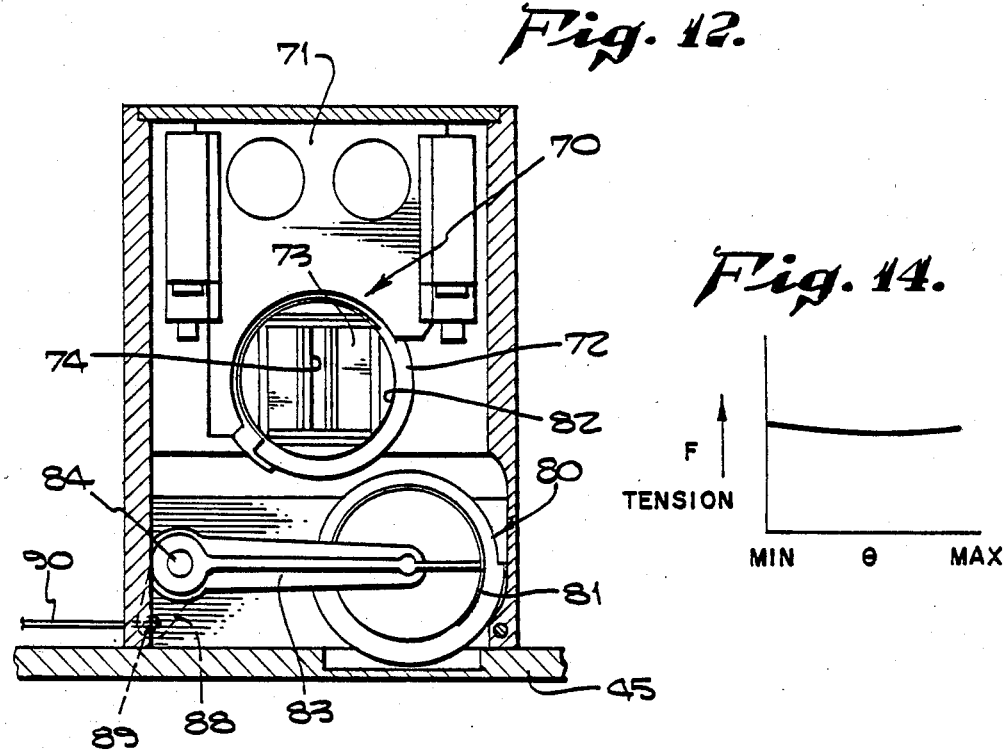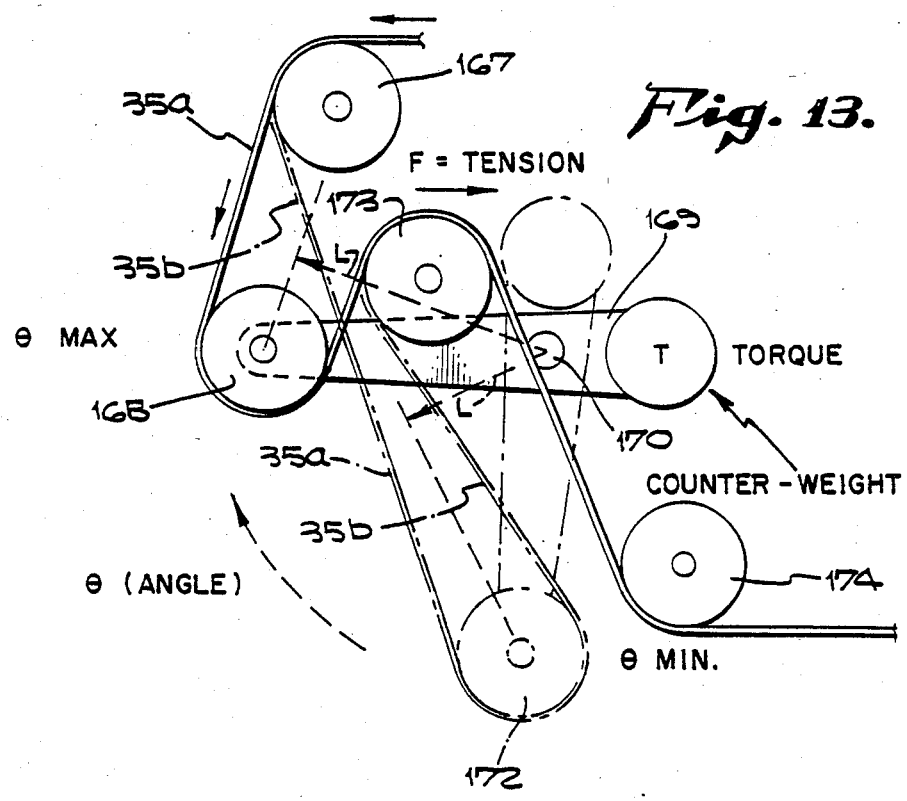

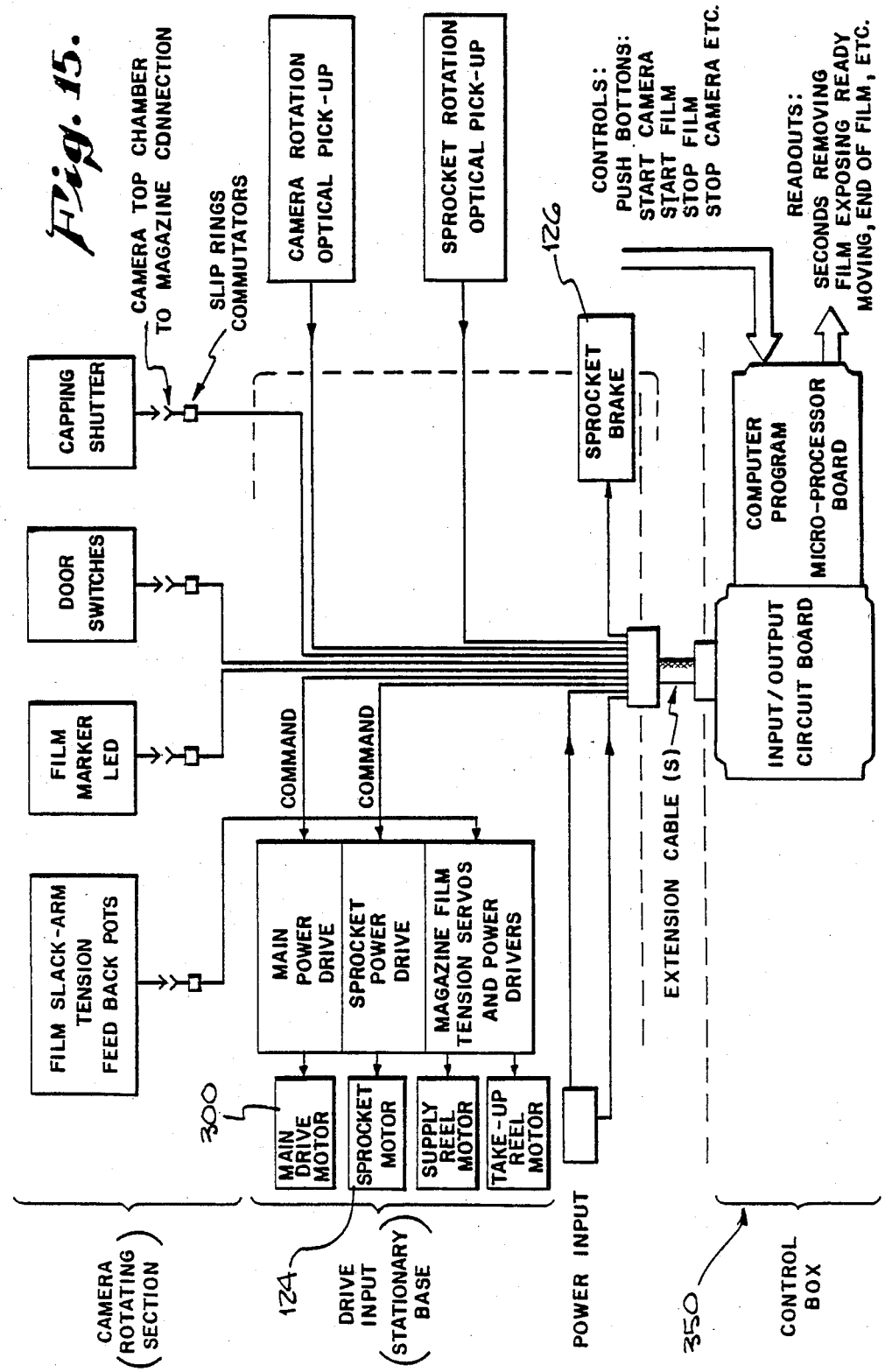

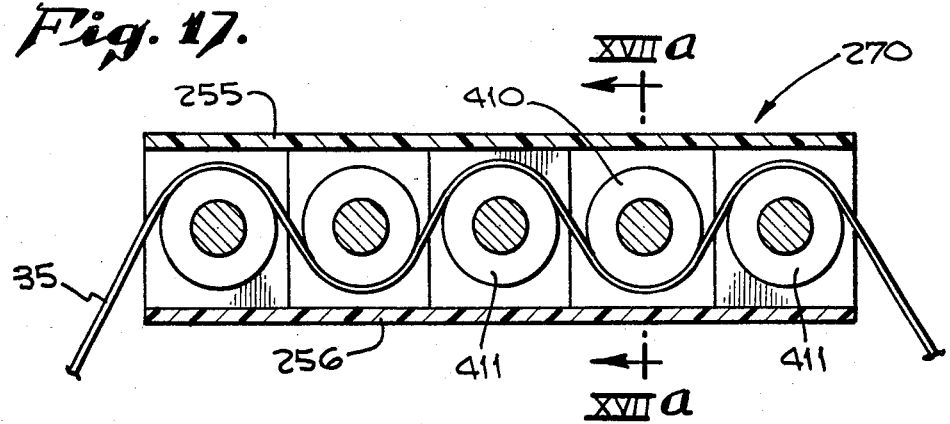
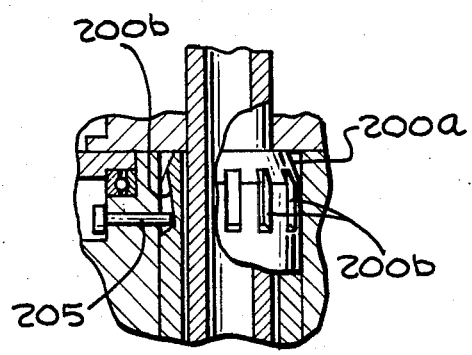
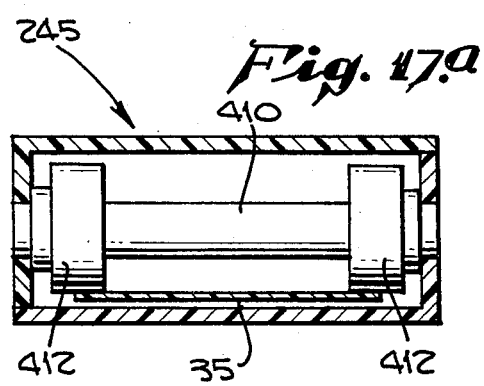
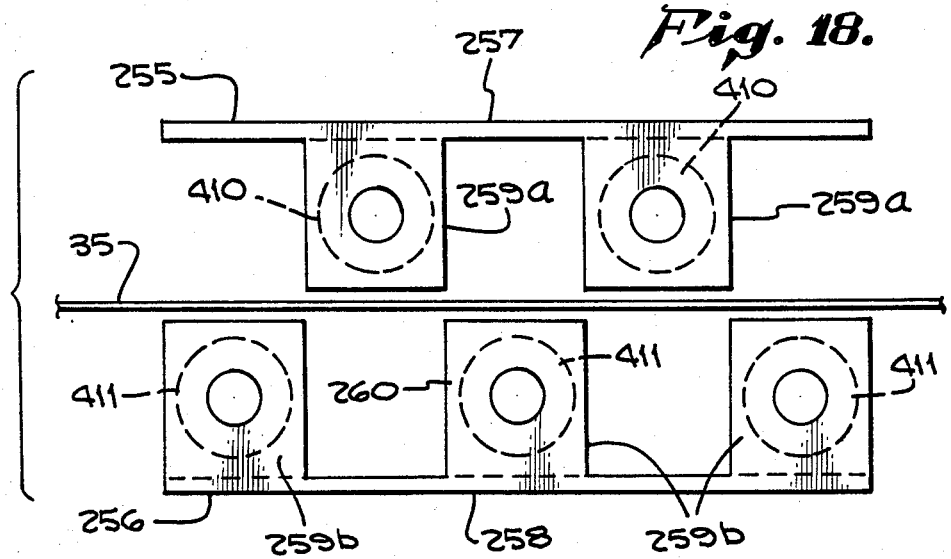

PANORAMIC MOTION PICTURE CAMERA AND METHOD

This application is a continuation-in-part of U.S. application Ser. No. 452,620 filed Dec. 23, 1982, now abandoned.

BACKGROUND OF INVENTION

The present invention relates to a panoramic motion picture camera in which a filmstrip is continuously nonintermittently exposed while the camera lens is rapidly rotated through 360°.

Panoramic cameras for still and motion picture photography have been previously proposed. Hanke, et al., U.S. Pat. No. 2,068,410, discloses a panoramic camera having three lenses angularly spaced 120° and rotatable about a central axis at a rate of speed of about sixteen revolutions per second. The camera casing supports film supply and take-up reels for each of the three lenses, each filmstrip passing through a film gate which is located between a shaft having an axis of rotation and the lens. The lens, film gates and film supply and take-up reels are located in the same planar zone. The camera casing and camera parts therein is first rotated, film movement being started by a manually operated brake which acts against an extension of the rotating shaft.

Back U.S. Pat. Nos. 2,349,931 and 2,815,701 disclose a panoramic camera in which the lens is rotated about an axis and the film supply and take-up reels are located on the opposite side of said axis and in the same planar zone as the lens. A sprocket on said axis is stationary while the film engages the sprocket without relative movement therebetween. A slit aperture is provided to expose the film while it is in contact with the sprocket. The focal length of the lens system is disclosed as equal to the radius of the sprocket.

In Van Praag U.S. Pat. No. 3,374,721, a lens and film reels lying in the same plane as the lens are rotated about an axis, the filmstrip passing over a rotatable sprocket at said axis, the film gate being adjacent the lens and spaced from the sprocket.

Globus, et al., U.S. Pat. No. 4,241,985, discloses another type of panoramic motion picture camera driven by a spring ribbon, this patent also including a discussion of the history of the panoramic camera. Globus, et al. U.S. Pat. No. 4,078,860 discloses a cycloramic projection system in which the film supply and film take-up reels are coaxial and spaced apart with the projection lens lying between the film reels and with the film path including a radial extension to provide space to translate the film between the separation reels.

Such prior proposed panoramic camera constructions were subject to various disadvantages in terms of expensive construction and mode of operation which required precise minimal tolerances; difficulties in maintaining uniform speed of rotation of camera lens and speed of the film which often resulted in banding on the exposed film; and severe wear and tear on edges and sprocket holes of the filmstrip. Use of standard motion picture accessories and facilities were minimized because of prior proposed special constructions and modes of operation. Further, such prior proposed panoramic motion picture camera systems were not adapted to operate at relatively high speeds of rotation. They were generally difficult to be kept in dynamic balance because of changing positions of the film material due to the arrangement of the supply and take-up film reels.

SUMMARY OF INVENTION

The present invention relates to a novel construction and method of operation of a motion picture camera adapted to take panoramic scenes of a full 360° and the provision of a motion picture film which may be readily adapted by standard motion picture practices to be projected at 360° to provide a panoramic motion picture scene. The invention particularly relates to a panoramic motion picture camera construction in which a filmstrip is continuously moved at cine speeds, that is, twenty-four scans per second, and which uses a standard fixed focal length lens and a filmstrip of any desired width, such as 35 millimeter, or 8, 16, or 70 millimeter filmstrips but not limited thereto.

The present invention contemplates a panoramic camera in which a cylindrical camera body assembly comprises a generally cylindrical stationary housing portion from which is supported an upper cylindrical rotatable housing portion. The latter encloses motion picture camera components including coaxially mounted film supply and take-up reels, a lens and film gate, and a film supply sprocket all of which rapidly rotate about an axis of rotation; the filmstrip being engaged for almost 360° with a central coaxial main sprocket having a circumference of one scan frame length, the camera lens focal length being directly related to the scan frame length. The lens is provided with a focal plane aperture slit between the lens and the film. The filmstrip passes over a film gate having such an aperture slit in an arcuate path to compensate for centrifugal forces to which the filmstrip is subjected during rotation of the camera lens. The invention contemplates that the filmstrip be provided a filmstrip path which in the planar zone of the lens and the film gate enables the filmstrip to accommodate itself to centrifugal forces while maintaining uniform tension. The invention also contemplates that the film supply and film take-up reels be located coaxially and in spaced planar zones beneath the planar zone of the rotating lens and main sprocket. The film path between the film reels and the top film chamber is guided by novel angularly split two-part film guide spools which enable the filmstrip to make an abrupt quick change in at least two directions and thus enhancing the compactness of the camera. The invention further contemplates various other novel features which contribute to the exposure of a filmstrip in continuous panoramic mode and in an optically uniform precise manner.

It is therefore a main object of the present invention to provide a panoramic camera of novel unique construction and mode of operation.

An object of the present invention is to provide a panoramic camera in which its construction is readily adapted to be dynamically balanced and stabilized.

Another object of the present invention is to provide a panoramic camera adapted to provide a continuous, uninterrupted scan of 360°.

Still another object of the present invention is to provide a panoramic camera in which the filmstrip is provided a unique film path including a plurality of spaced planar zones and which leads from a film supply reel in one zone and to a film take-up reel in another zone coaxial with the film supply reel and coaxial with the axis of rotation of the rotatable lens of the camera located in another zone.

A still further object of the present invention is to provide a panoramic camera in which centrifugal forces acting upon the filmstrip are readily compensated for and in which a film gate having curved filmstrip supporting surfaces assists in guiding the film into a plane perpendicular to the optical axis of the lens at a film gate having a slit aperture therein.

The invention contemplates a novel means for driving the lens, film gate, and filmstrip supply sprocket in rotation about an axis and in a manner which provides unique advantages of operation.

A still further object of the present invention is to provide a panoramic camera in which its method of operation provides efficient use of the filmstrip by utilization of reversible motors driving film supply and film take-up reels in order to permit continuous complete exposure of the filmstrip.

A further object of the invention is to provide novel bidirectional film guide spools adapted to translate the path of the filmstrip from one direction in a planar zone to another direction in which the film path departs from said planar zone for travel in a planar zone spaced from and parallel to the first planar zone.

The invention contemplates novel guide means for the filmstrip portion in its path between the two spaced parallel planar zones. A preferred example of such film guide means includes an arrangement of friction free rollers to support and guide the filmstrip in a serpentine path with edges of the film having rolling contact with the rollers.

A further object of the invention is to provide means for maintaining uniform tension of the filmstrip as it is fed to and from the film gate means, such uniform tension means including spring biased film slack arms each carrying a film guide spool at one end thereof and so arranged with adjacent film guide spools that film tension is made uniform by changes in length of the effective moment arm of the slack arm with respect to the film path defined by the adjacent film guide spools.

A still further object of the present invention is to provide convenient alignment means on the shafts of the main sprocket and film supply sprocket which may be correlated with a detent means between the two sprockets for assuring film and film sprocket alignment when a top cover door is installed prior to operation of the camera.

A still further object of the present invention is to provide a convenient pin and multiple slot means therefor for facilitating assembly of the film takeup and suply reels with their drive means.

The invention contemplates a rotatable camera housing portion provided with means for stabilizing and maintaining rotation thereof about the axis of rotation and for positively restricting any axial displacement of the rotatable portion so that the optical axis of the rotating lens will be precisely held in a plane. Such stabilizing means is external of the rotatable housing portion and readily engaged and disengaged therefrom.

A still further object of the present invention is to provide a capping shutter readily operable to prevent exposure of the filmstrip under certain conditions of operation.

The present invention also contemplates a novel method of operation of a panoramic camera by novel control means which may include a computer program and suitable readout information relating to the starting and stopping of the filmstrip, exposure and the like.

Various other advantages and objects of the present invention will be readily apparent from the following description of the drawings in which an exemplary embodiment of the invention is shown.

IN THE DRAWINGS

FIG. 3b is an enlarged fragmentary sectional view taken in the same plane as FIG. 3a and showing the stationary camera housing portion and a lower portion of the film take-up reel chamber;

FIG. 5 is a fragmentary horizontal transverse sectional view taken in a plane indicated by line V—V in FIG. 3a immediately below the planar zone of the filmstrip path shown in FIG. 4 to illustrate drive means for vertical adjustment of the lens in the upper film and lens chamber;

FIG. 6 is a fragmentary enlarged sectional view showing the film path from the supply reel to the film and lens upper chamber by utilizing bidirectional film spools;

FIG. 7 is a fragmentary sectional view showing the film path from the film-lens chamber to the planar zone of the film take-up reel and utilizing bidirectional film guide spools;

FIG. 8 is a elevational view, partly in section, of a bidirectional film guide spool embodying the invention;

FIG. 9a is an enlarged educational view of a film casing guide means located between the takeup reel and film-lens chamber shown in FIG. 7.

FIG. 9b is an enlarged fragmentary sectional view taken in the plane indicated by line IXb—IXb of FIG. 9a and showing an offset arrangement of film guide rollers in the guide casing means.

FIG. 12 is a fragmentary enlarged view of the gate means and of capping shutter means, the section being taken in a vertical plane indicated by line XII—XII of FIG. 5.

FIG. 13 is a fragmentary schematic view of the film path in the film-lens chamber illustrating the action of the slack arm to provide uniform tension on the filmstrip.

FIG. 14 is a chart illustrating the tension force through minimum and maximum angles of theta of the slack arm as measured from its pivot axis from normal relaxed position to maximum tension position.

FIG. 15 is a chart illustrating control means for the camera;

FIG. 17 is an enlarged sectional view of a filmstrip guide means for transporting the film between the film supply reel and the lens chamber, the view being taken along a plane longitudinally bisecting the guide means.

FIG. 17a is a transverse sectional view taken in the plane indicated by line XVIIa—XVIIa of FIG. 17.

FIG. 18 is an enlarged exploded view of the assembled guide means shown in FIG. 17, the guide means extending between the supply reel and the film chamber as shown in FIG. 6.

FIG. 19 is a fragmentary view of the connection between the supply reel and its drive tube, the view being partly in section and partly in elevation to show the multiple slot configuration of the upper end of the drive tube to facilitate assembly of the film supply reel with the drive tube.

DETAILED DESCRIPTION OF THE INVENTION

Figure 1:
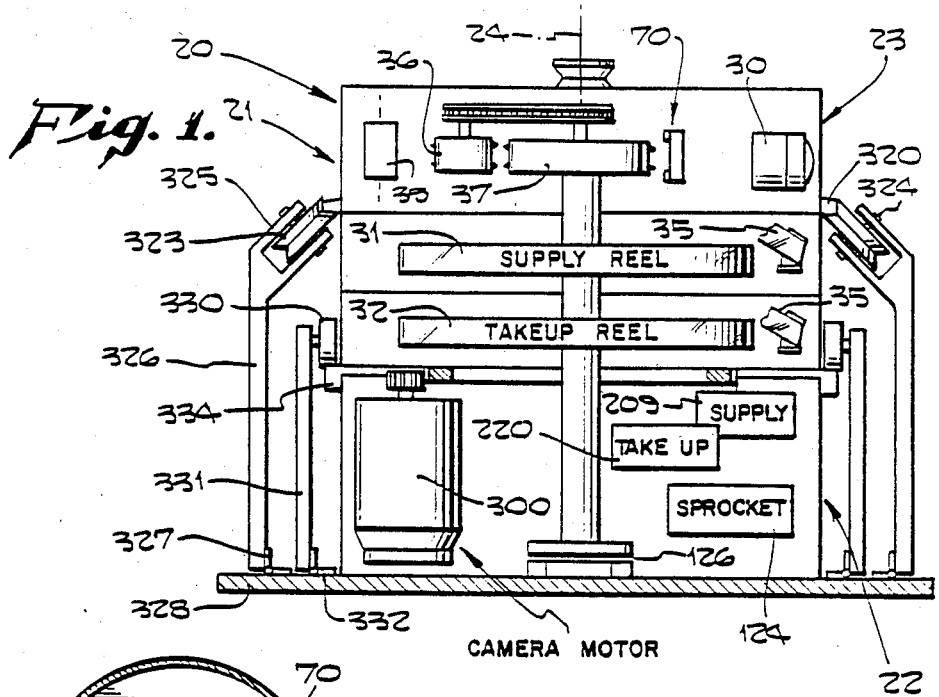
FIG. 1 is a schematic elevational view with wall portions removed of a panoramic camera embodying this invention.

Referring first to FIG. 1, a panoramic motion picture camera embodying the present invention is schematically illustrated and identified generally at 20. Camera 20 may include a camera body assembly which includes a stationary housing portion 22 and a rotatable housing portion 23 thereabove and defining an axis of rotation indicated at 24. Generally speaking, the stationary housing portion 22 may house those components of the camera which are required to be stationary such as a camera motor means 25, a film supply reel motor 26, a take-up film reel motor 27 and a main sprocket motor 28. The rotatable housing portion 23 supports therewithin other camera components including a lens means 30 located for rotation about axis 24 in an upper or top planar zone, a film supply reel 31 located for rotation about axis 24 in a second intermediate planar zone of rotation below that of lens 30, and a film take-up reel 32 rotatable about axis 24 and located in a third planar zone lying below the planar zone of the film supply reel. Generally speaking, filmstrip 35 from supply reel 31 is directed to the planar zone of the lens by a plurality of guide spools 40 including novel bidirectional spools 34 and after moving through a path as later described in detail, the filmstrip 35 is passed about a driven film supply sprocket 36 and then about a normally stationary main film sprocket 37 coaxial with axis 24. In the top planar zone film gate 38 provided with a slit aperture is positioned between the lens 30 and the main sprocket 37, the film gate being spaced from the main sprocket 37. Lens 30 may be located proximate to the outer circumference of the upper rotatable housing portion 23 and a counterbalance means 39 is provided diametrically opposite thereto.

From a general consideration of FIG. 1, it will be apparent that the major components of the panoramic camera for continuously scanning 360° are rotatable about central axis 24 and that the film supply and film take-up reels are vertically spaced in spaced planar zones and are in coaxial relation to axis 24 about which the lens 30, counterweight 39 and film supply sprocket 36 are rotated. Dynamic balancing of the rotatable housing portion 23 and the components of the camera housed therewithin may be readily and accurately achieved. The changing of the path of the filmstrip 35 from the supply reel to the film supply sprocket 36, to main sprocket 37 and to film take-up reel 32 maintain a substantially balanced relationship. The speed of film withdrawn from supply reel 31 and that of the film wound on take-up reel 32 occur at about the same rate and under uniform tension as later described. When the rotatable housing portion 23 is rotated at an operable speed of approximately 1440 revolutions per minute (24 frames per second), dynamic balance of the camera components within the rotatable housing portion 23 may be readily maintained. Some of the radial outermost components of the camera may be subjected to multiple "G" forces Which may effect the filmstrip path and the operation of the camera shutter as described later.

Generally speaking, in operation, with the lens and film tension adjusted, the rotatable housing portion with the camera components therein is caused to rotate about axis 24, including the main film sprocket 37, until a selected speed is reached. Upon reaching the selected speed, a brake is applied to stop rotation of only the main sprocket 37. filmstrip 35 is then continuously engaged with the main sprocket as the other camera components in the rotatable housing portion rotate about axis 24, the film sprocket 36 being rotated to provide relative movement between the filmstrip and film gate for exposure of the film. The focal length of the selected lens 30 is directly related to the circumferential path of the filmstrip about the main sprocket 37, the circumferential length of such path being the equivalent of the length of one scan of 360°. The focal length of the lens should be equal to the scan length divided by 2 Pi. This relationship is known in the panoramic camera art (U.S. Pat. No. 2,815,701).

ROTATABLE HOUSING PORTION

The rotatable housing portion 23 may comprise an upper housing section 40 containing the lens 30, film supply sprocket 36, main sprocket 37, counterweight 39 and other camera components. A separable lower housing rotatable section 41 may generally contain the film supply reel 31 and the film take-up reel 32.

UPPER HOUSING SECTION

The upper housing section 40 includes a cylindrical wall 43 of selected diameter and is provided with a light admitting port 44 for the lens 30. Section 40 also includes a circular bottom wall 45, a top circumferential wall 46 within which is provided a circular door 47 having a joint line at 48 of stepped form with circumferential portion 46 to provide a suitable light seal. Within the chamber formed by cylindrical wall 43 may be provided spaced subplates 49 and 50, generally C-shaped members 51 in spaced relation and secured to transversely extending spaced strengthening bars 52 (FIG. 5) which extend transversely of the chamber for a major portion of the width of the chamber. At the opposite ends of the strengthening bars 52 may be provided vertical spaced walls 53 defining a lens chamber 54 adjacent light admitting port 44. Extending traversely across the lens chamber 54 and between the top cover 47 and bottom wall 45 are partitions 56 and 57.

Partition 56 may be vertically movable and suitably connected to the internal end portion of lens 30 for mounting of the lens. Vertical side edges of the movable partition 56 may be recessed in vertically extending recesses 58 in each of the walls 53 to provide vertically adjustable slidable mounting of lens 30. Such vertical adjustment of the lens 30 may include a lead screw 59 having a lead nut 60 secured to the partition 56 by a suitable securement screw 61. On the opposite side of partition 56, a lock screw and nut assembly 62 is provided for securing the lens 30 in its selected vertical adjusted position. The forward portion of lens 30 may be suitably mounted as generally indicated at 63 to guide the entire lens 30 in its vertical translational movement. The function of the vertical adjustability of the optical axis of lens 30 will be described later.

Also, extending between the strength bars 52 and the adjacent portions of walls 53 is transverse wall 57 which serves as a mounting means for suitable gate means generally indicated at 70 (FIGS. 5, 12). Gate means 70 (FIG. 12) may include suitable removable components such as removable plate 71, aperture mounting plate 72 and an aperture plate 73 which provides a slit aperture 74 of selected width. The gate means is so constructed that plate 71 and 72 may be readily removed for the insertion of an aperture plate 73 having a slit aperture of a different selected width to accomodate different photographic conditions. The slit aperture 74 of gate means 70 is on the optical axis O of the lens means 30. At the transverse zone which includes the slit aperture 74, the partition wall 57 may be provided with a front arcuate guide surface 76 across which filmstrip 35 passes,, the arcuate film guiding surface being convexly curved with respect to said lens means. The curvature of the arcuate surface 76 is selected so that when rotatable housing portion 23 is rotated at 1440 rpm, the centrifugal forces acting upon that portion of filmstrip 35 which passes between the transverse vertical edges of the film gate port 77 will assume a position in a plane normal to the optical axis and parallel to the slit aperture opening. The use of such arcuate surface 76 is correlated with the centrifugal forces acting on the incremental sections of the filmstrip at the film gate port 77 to obviate use of a film pressure plate to maintain a filmstrip plane normal to the optical axis. It may be noted that while the film gate 70 is relatively close to the circumference of the main sprocket 37, the film gate and the slit aperture 74 may be located at any suitable radial distance from the axis of rotation depending upon the diameter of the cylindrical wall of the upper housing section.

Also associated with the gate means 70 is a capping shutter means generally indicated at 80, FIGS. 5 and 12. In FIG. 12, capping shutter 80 comprises a circular disc 81 having an outer circumference greater than the inner circumference 82 of the aperture mounting plate 72. Circular disc 81 has a planar surface which closely mates with surfaces of the mounting plate 72 and is adapted to completely cover and seal the opening defined by inner circumference 82. Circular disc 81 is mounted on an arm 83 which is pivotally mounted at 84 by a pin 85 (FIG. 5) which extends through wall 57 and on the inboard side of wall 57 carries a counterweight 86. At the outboard end portion of pin 85, a spring means 87 biases the capping shutter 80 into normally closed position of gate means 70. The pivotal mounting of arm 83 includes on the inboard side of wall 57 a lever arm 88 provided with a hole 89 to which is connected a wire link 90 connected at its other end to an arm 91 connected at 92 to a solenoid (not shown). The opposite end of arm 91 is provided with a counterbalance 93. Operation of the solenoid 92 causes the capping shutter arm 88 to be rotated in a clockwise direction from its normally biased closed position to a fully open position as shown in FIG. 12. Use of the capping shutter will be described later.

Also included in the upper housing section 40 is counterweight 39 mounted diametrically opposite lens 30 and on the optical axis thereof. Counterweight 39 is carried by a suitable transverse members 100 connected at its opposite ends to a pair of spaced lead screws 101, each provided with a lead screw nut 102 providing vertical adjustment of the height of counterweight 39. Correlated vertical adjustment of the lens 30 and the counterweight 39 is provided by extending the lead screws 101 and lead screw 59 downwardly below subplate 50 to provide a suitable flexible belt drive therefor as indicated at 105 in FIG. 5. It will be noted that the flexible chain drive 105 passes around sprockets on lead screws 101 and thence to an idler sprocket 106 to an adjustment sprocket 107 and then to a sprocket 108 provided at the end of lead screw 59. A tensioner idler sprocket 109 may be provided so that the path of the chain 105 may be suitably routed beneath the subplate 50 and through an opening 110 in support bar 52. Adjustment knob 107a is provided on the end of a shaft which extends through subplate 50 and is accessible from the top of the upper housing section when the door 47 is removed. The height of the counterweight 39 and the lens 30 can be precisely vertically adjusted in a direction parallel to the axis of rotation 24 while maintaining the centers of gravity of the counterweight and lens in a plane perpendicular to axis 24. While a manual method of vertical translation of the position of the optical axis of the lens has been illustrated, it will be readily understood that the invention contemplates that other means, such as automatic remote control may be employed to adjust the vertical translation of the optical axis of the lens and to secure the lens in a selected position.

Also contained within the upper housing section 40 are the main film sprocket 37 and the film supply sprocket 36 which are diametrically aligned with lens 30 and are in suitable spaced relation. Both sprockets 36 and 37 lie between subplates 49 and 50. Main film sprocket 37 has a circumference or a diameter which is related to the focal length of lens 30 as mentioned above. Sprockets 36 and 37 are selected for the size of film to be exposed and may include sprockets adapted for use with film of a size such as 8 mm, 16 mm, 35 mm, and the like.

Sprocket 37 includes sprocket teeth 116 of selected number depending upon the film used and adapted to support filmstrip 35. Sprocket 37 includes a hub 117 supported from subplate 50 for rotation with respect thereto and includes an internal cylindrical bore 118 adapted to fixedly receive the upper end 119 of a main sprocket hollow supporting column 120 (FIG. 3b) which extends into the stationary housing portion 22. Adjacent the lower end of column 20 is mounted a pulley wheel 121 which connects through a suitable pulley belt 122, a drive pulley 123 of a suitable sprocket driving motor 124. Sprocket motor 124 may be mounted in stationary housing portion 22 in any suitable manner. In some panoramic camera versions embodying the present invention, a sprocket motor may not be required.

The lower portion of sprocket column 120 is connected at its bottom to a magnetic brake 126 which is adapted to stop rotation of main sprocket column 120 during operation of the camera for exposing film.

Within hollow sprocket column 120 is a coaxial rod 127 which may be suitably fixedly connected to column 120 as by a pin 128. Column 127 and its top portion 129 is held in loose axial alignment with axis 24 and column 120 by a bushing member 130 having a tubular portion which extends downwardly into the sprocket core and into the upper portion 119 of column 120. Column 127 serves as a torsion means for smoothing advancement of the filmstrip during start up operation of the camera as will be later described. At its top, rod 127 is provided with a flattened tongue extension 130 adapted to be received within a complementary slot or recess 130a on depending member 131 to provide a releasable connection to the top cover 47. Member 131 carries a gear 132 which meshes with an intermediate gear 133 supported on a shaft 134 from subplate 49. Shaft 134 extends above gear 133 to carry a pulley 135 which carries a belt 136 for connection to a pulley 137 carried on a shaft 138 carried by top plate 47 and extending downwardly with a recess 139 at its lower end for engagement with a shaft 140 which carries film sprocket 36. The upper end of shaft 140 has a flattened tongue extension 141 for engagement with a slot in shaft 138 to provide a releaseable driving connection therebetween. It will thus be apparent that the pulley drive and gear chain means 132 to 136 provide a drive means for rotating film sprocket 36 when the main sprocket 36 is stationary and while the housing portion 23 is rotated.

Figure 4:
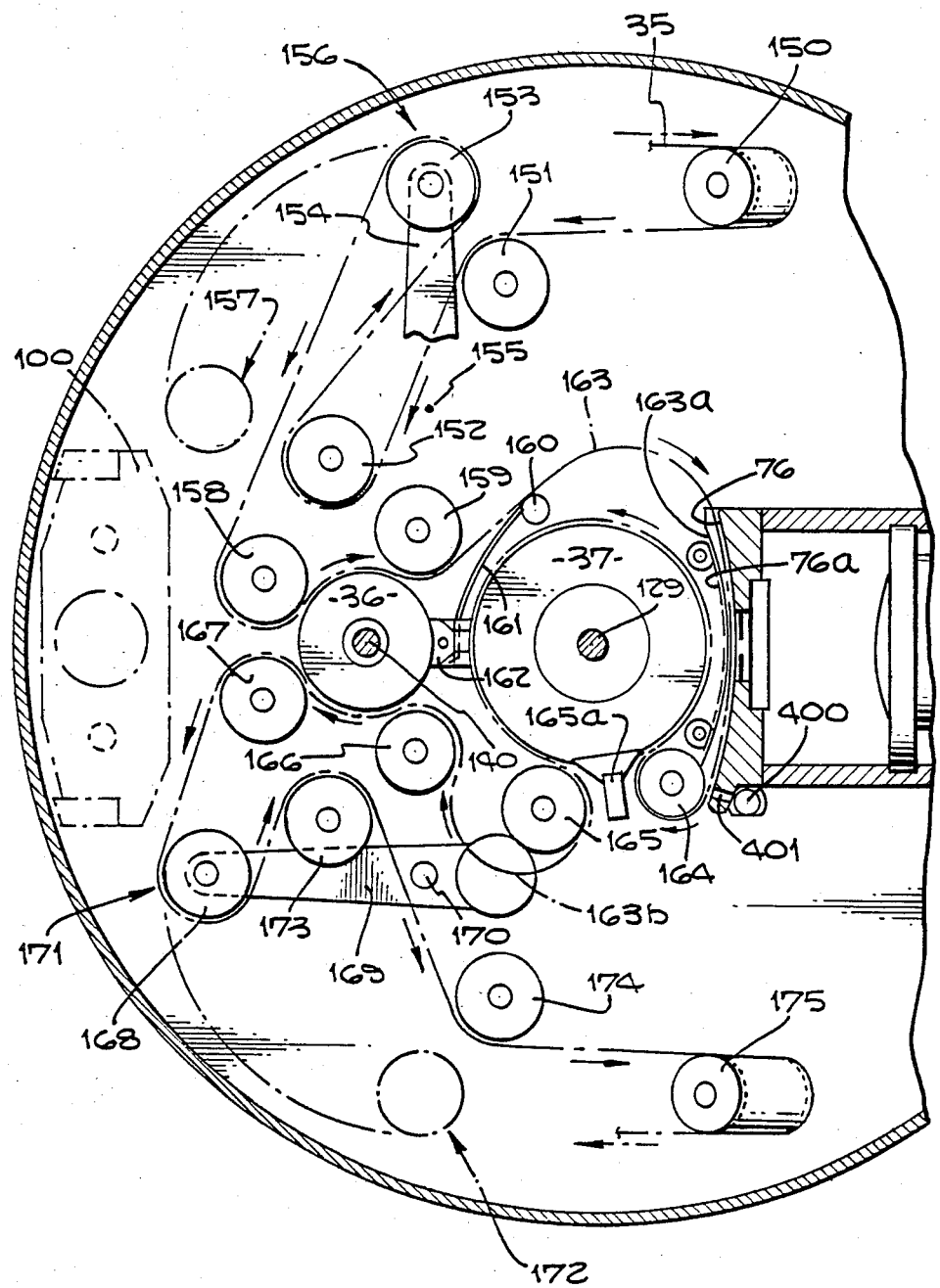
FIG. 4 is an enlarged fragmentary sectional view of the film and lens chamber, the section being taken in a horizontal plane just above the planar zone of the filmstrip path in the upper rotatable camera housing portion and illustrates the film path.

Also contained within the upper housing section 40 is a system of filmstrip guide spools best shown in FIG. 4 to provide a filmstrip path in the planar zone of the film sprocket 36 and main sprocket 37 and to suitably receive filmstrip 35 from film supply reel 31 and to deliver exposed filmstrip 35 to film take-up reel 32. The filmstrip 35 may enter the chamber provided by the upper housing section at a bidirectional film spool 150 and may pass over an idler spool 151 to another idler spool 152 and then around a spool 153 carried by a slack arm 154 and pivoted about an axis at 155. The slack arm 154 with its film guide spool 153 is adapted to move in an arc between the position shown at 156 and a position shown in phantom lines at 157. The arrangement of the slack arm is such as to maintain uniform tension on the filmstrip under conditions of operation in which centrifugal forces affect the filmstrip as later described herein. Filmstrip 35 then passes about an idler spool 158, engages film supply sprocket 36, and then is guided past a guide spool 159. The film is guided over a relatively small diameter guide post 160 carried by subplate 50 and supporting one end of a film guide plate 161 supported at its other end at a filmstripper 162. Under the influence of centrifugal forces on the filmstrip, the filmstrip is bowed radially outwardly as at 163 and approaches the curved film guide surface 76 to pass between top and bottom edge guides 163a, only one being shown in FIG. 4. A removable light shield 76a may be provided at the edge guides 163a to limit the entry of stray light at the film gate and aperture slit. After the filmstrip crosses the slit aperture, it passes around idler spool 164 and returns through slightly more than a 180 degree turn to pass around the main film sprocket 37 for a major portion of the circumference of the sprocket after which the strip is guided past idler spool 165 which is closely spaced circumferentially to idler spool 164. A filmstripper 165a is provided between the latter two spools to assure that the film leaves the main film sprocket 37 at the idler spool 165. The film then passes around spool 166 and past the film supply sprocket 36 to spool 167. After leaving spool 167, the strip 35 passes about idle spool 168 supported on slack arm 169 pivoted at 170 to permit the slack arm 169 to move from the position shown at 171 to a maximum position shown by phantom lines at 172. The arrangement of the filmstrip 35 with respect to both slack arms 154 and 169 is identical. Strip 35 then passes about idle spool 173 to idle spool 174 and thence about a bidirectional film spool 175 for directing the exposed filmstrip 35 to take-up reel 32. It should be noted that in the illustration of the film path in FIG. 4 that the effect of centrifugal force on the filmstrip is indicated at certain areas by a film path which is not the most direct path between the adjacent spools as at 163 and 163b.

Figure 2:
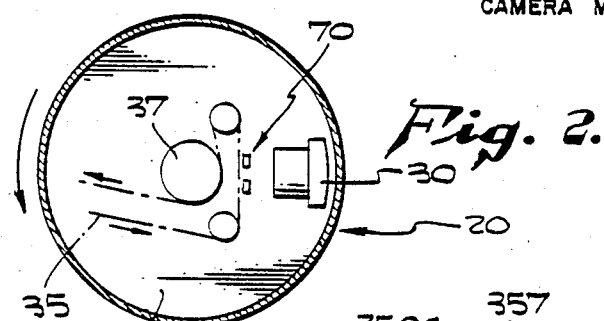
FIG. 2 is a top schematic plan view showing the lens and film path as viewed from the ground.

In both FIGS. 2 and 4 it will be noted that the direction of film travel through the film gate is reversed with respect to the direction of film travel about the sprocket 37 to provide image reversal because of the lens reversing the image.

Before describing the lower housing section 41 it should be noted that the slack arms 154 and 169 provide a means for maintaining the tension of filmstrip 35 substantially uniform. Operation of only one slack arm will be described for brevity. At pivotal mounting 170, slack arm 169 is provided a standard coil spring (not shown) of selected strength which normally biases slack arm 169 into the position shown at 172 (FIG. 13). As film tension increases, the slack arm is moved from its normally biased minimum condition at 172 and swings clockwise (FIG. 13) through an arc about pivot axis 170. During its travel in this arc as a result of tension applied to the filmstrip, the effective moment arm "L", extending from the pivot axis 170 to a point medial the two filmstrip portions indicated at 35a and 35b and at 90° to the medial line therebetween, changes in relative position with respect to the pivot axis. The effective moment arms "L", varying and acting on filmstrip portions 35a and 35b, compensates for the increase in spring biasing force of the tightened coil spring so that the resultant tension maintained in the filmstrip is substantially uniform. The maintenance of substantially uniform tension is illustrated in the chart, FIG. 14, which on the X axis indicates the angle 0 of change of the slack arm, and on the Y axis indicates the amount of torque or tension being applied to the filmstrip. The curve is not precisely straight, but the variation in curvature is minimal with the result that filmstrip tension on that portion of the filmstrip being fed to the film gate and that portion of the film being delivered from the film gate is substantially uniform.

It should also be noted that the positioning of filmstrip 35 between the film supply sprocket 36 and the main film sprocket 37 is facilitated by means of an alignment means presently described. Supported on the subplate 50 is a suitable block 180 provided with a bore which contains a compression spring 181 against which is seated the lower end of a pin 182 which carries beneath the plane of sprockets 36 and 37 a transverse diametric bar 182a for engagement with diametric detent recesses 183 in sprockets 36, 37. The top end of pin 182 extends to the top plane of the sprockets 36 and 37 and is normally biased upwardly by the spring 181 for engagement of bar 182a with the detent recesses 183. When filmstrip is wound on sprockets 36 and 37, the sprockets may be turned relative to each other until the alignment bar 182a is biased upwardly into the detent recesses 183 in the sprockets 36, 37. In such position, the sprockets are restrained against relative rotation. Since relative rotation must occur during operation of the camera, when top door plate 47 is assembled with the upper housing section 40, the depending actuating pin 184 in alignment with the pin 182 is provided sufficient length so that upon contact with the top edge face of pin 182, pin 182 is depressed against the biasing spring 181 and the transverse diametric detent bar 182a is released from engagement with the sprockets 36 and 37 to permit relative rotation thereof during operation of the camera.

Figure 3A:
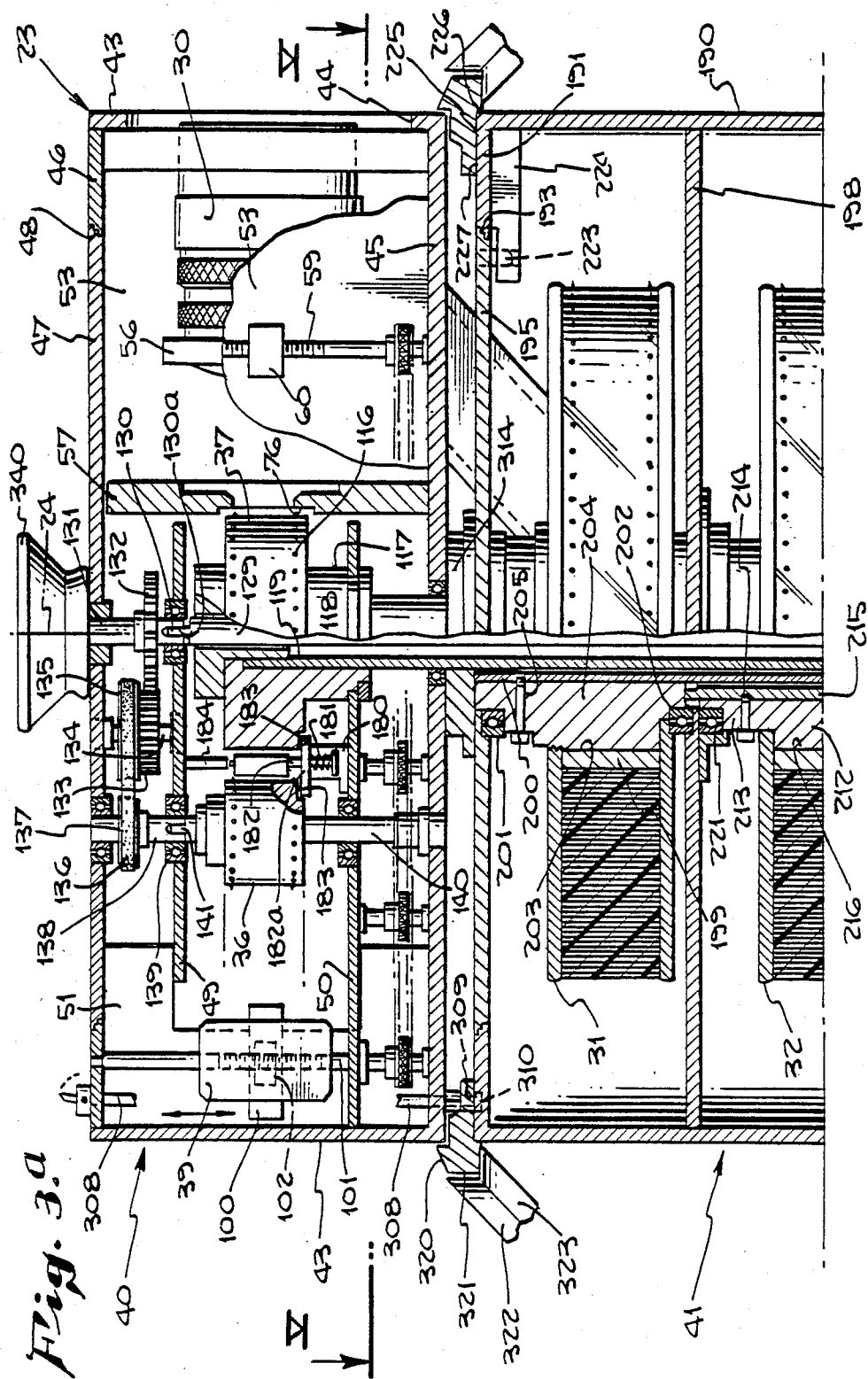
FIG. 3a is an enlarged fragmentary sectional view of the rotatable top camera housing portion, the section being taken in a vertical diametrical plane, and illustrating the film and lens chamber, the film supply reel chamber, and a portion of the film take-up reel chamber.

The alignment feature of this diametric bar 182a is arranged so that the releasable and slot connections 130 and 141 between the top cover 47 and the shafts 129 and 140 are also in diametric alignment (not as illustrated in FIG. 3a, but turned 90° from the shown position in FIG. 3a). Thus, proper positioning of the filmstrip is assured and also alignment of shaft 129, 140 and shafts 131, 138 respectively with minimum effort of the operator.

LOWER HOUSING SECTION

The lower horizontal housing section 41 may comprise a cylindrical wall 190, top and bottom wall margins 191 and 192 which provide a top opening 193 and a bottom opening 194 for a top door 195 and a bottom door 196, respectively. The joint lines between the doors 195 and 196 and the circumferential top margins and bottom margins 191 and 192 may be of stepped configuration to provide a light seal. Intermediate the top and bottom doors 195, 196 is provided a centrally disposed transverse partition 198 to define a film supply magazine chamber and a lower film take-up magazine chamber. Within the top chamber, film supply reel 31 is mounted for rotation about axis 24. The core 199 of the film reel 31 may be enlarged to provide suitable fitting of reel 31 on the upper end of a hollow tube 200 which may be supported in bearings 201 and 202 associated with the top door 195 and the intermediate partition 198 respectively. The reel 31 is provided with an enlarged central opening 203 for reception of the enlarged hub 204 provided with an extension which may carry a suitable spring loaded pin 205 for securing the hub 204 to the upper portion of tube 200. To facilitate adjustment and securing of hub 204 to the hollow drive tube 200 the upper end portion of tube 200, FIG. 19, may be provided with a short beveled or conical section 200a provided with a plurality of longitudinally extending channels or grooves 200b which extend into the metal section below the widest portion of the conical section for reception of the pin 205. When the supply reel is reassembled with the drive tube 200 and the door 195 is removed, the pin 205 will engage one of the plurality of grooves 200b to facilitate angular orientation of the film reel almost immediately upon positioning of the film reel over the top end portion of the tube 200. The conical surface 200a is so grooved that reception of the biased pin 205 into one of the grooves 200b is readily made.

Hollow tube 200 is spaced from column 120 with noninterference clearance and extends downwardly through the take-up reel chamber and into the stationary housing portion 22, the lower end of tube 200 being provided with a pulley 207 which is driven by a pulley belt 208 by a supply reel reversible motor 209 having a drive pulley 210. The supply reel motor may be suitably mounted within the stationary housing portion 22 in a well-known manner. The lower end of tube 200 may be supported in bearings 211 supported from the stationary housing portion 22 in suitable manner as by member 211a.

In the lower film magazine chamber provided by the lower rotatable housing section 41 there may be somewhat similar mounting for film take-up reel 32 including a hub 212 provided With an upper extension 213 which may be pinned by a suitable spring loaded pin 214 to the upper end of an external tube 215 coaxial with axis 24. The arrangement of the top end portion of tube 215 and the spring loaded pin 214 is similar to that described with respect to FIG. 19 and the drive tube 200 and pin 205. Such arrangement facilitates the assembly of the film take-up reel 32 with its drive tube 215. Take-up reel 32 may be similarly provided with an enlarged core opening 216 for suitable releasable mounting with respect to the hub 212. Tube 215 extends downwardly through the door 196 into the stationary housing portion 22 and carries at its bottom end a pulley 217 for a pulley belt 218 which is driven by a drive pulley 219 on the end of a motor shaft of a take-up reel reversible motor 220. The take-up motor is also suitably mounted within the stationary housing portion 22. Noninterference spacing is provided between the hollow tube 215 and the internal tube 200 so that both may rotate relative to each other. Ends of tube 215 may be suitably mounted in bearings 221.

It will be apparent that access to film supply reel 31 may be had through door 195 and access may be had to the film take-up reel 32 through door 196 when the rotatable housing portion is disassembled from the stationary housing portion 22 and the upper housing section 40 disassembled from the housing section 41. Doors 195 and 196 may be releasably locked in closed position by a plurality of circumferentially spaced releasable-locking pins 223 on each door, pins 223 being engageable with bores 223a in lock members 224 carried on marginal walls 191, 192.

In assembly of the supply and take-up reels with their drive means a new supply reel of film is loaded through door 195, a long length of film leader is withdrawn from the supply reel and threaded through the film guides and through the film chamber until the end thereof is inserted into the film guide leading to the take-up reel and then associated with the take-up reel which is accessible by opening the bottom door 196 (FIG. 3b). When the film has been threaded the doors 195 and 196 are closed and the film magazine 41 is lowered over the drive tubes 200 and 215. The pins 200 and 214 which are biased inwardly may or may not initially engage grooves in the upper ends of their respective drive tubes 200 and 215. Upon start-up of the camera initial slight relative rotation between the film magazine and the drive tubes will automatically cause the pins 205 and 214 to engage a groove in their respective drive tubes to interlock the reels with the drive means for rotation of the reel.

Housing sections 40 and 41 are separable and may be releasably secured together by a plurality of circumferentially spaced bolts 308 which extend through the marginal top wall portion 46 and through bottom wall 45 for threaded engagement with a nut 309 secured to marginal wall portion 191 on section 41. The top of each bolt may include a suitable lever means to facilitate turning of the bolt. The circular edges 225 and 226 of sections 40, 41 may be mated in a suitable configuration as at 227 to provide a light seal.

FILMSTRIP PATH

The film reels 31, 32 are coaxial in parallel spaced apart planar zones and are parallel to the planar zone of the path of the filmstrip in the upper section 40. Space within cylindrical walls 43 and 190 is relatively limited. filmstrip departing from the supply reel 31 is guided through space available adjacent to the circumferential walls of the camera housing and also through openings in the top wall 195 and the bottom wall 45 of the upper housing section. Passage of the film between the two housing portions or sections is best shown in FIGS. 6 and 7 wherein the filmstrip 35 leaving the film supply reel 31 is guided to a bidirectional film spool means 230 mounted between the top wall margins 191 and the intermediate wall 98. Filmstrip ports 231 and 232 are provided in the walls 191, 45 respectively, the filmstrip 35 being subject to a bidirectional change in path by a spool means 233 supported between the wall 45 and the top wall margins 46.

Each bidirectional spool means 230 and 233 may be substantially similar, one spool means being described in detail (FIG. 8). Bidirectional spool means 230 includes a pair of spool parts 234 and 235, each having a base flange 236 and a conical spool portion 237 having a surface which tapers or decreases in diameter toward the end of the spool part distal from the flange. Each spool part has an axis 238 about which the spool part may rotate, the axes of mating spool parts 234, 235 being arranged at a selected angle to each other. In FIG. 6, such angle is approximately 45° in order to translate the film path in a horizontal zone to a path in a zone at 45° thereto. Similarly, the spool means 233 (150) receives the filmstrip at a 45° path and translates the 45° path to a horizontal path leading to the arrangement of idle spools and the film path system shown in FIG. 4. In FIG. 7 the change in direction made by the spool means is about 60°.

Suitable mounting means may be provided for each spool part 234. 235. In spool means 230, shaft 234a about which the conical spool part 234 rotates may extend into intermediate wall 198 for positioning and mounting thereof. The mating spool part 235 may be supported from top margin wall 191 by a suitable block 239 which provides a bore and securement means for shaft 235a of part 235.

Similarly, spool means 233 may be mounted with one of its spool parts rotatably mounted in a supporting block 240 and its mating spool part may be mounted in a suitable block 241 carried by the top marginal walls 46 of the upper housing section 40. The arrangement of the spool portions 237 of each of the mating bidirectional spool means is such that the conical configuration thereof avoids contact with the filmstrip except at longitudinal edge portions of the filmstrip, such contact being partly along the conical surface and partly adjacent the flanges 236. Even though the filmstrip changes its path of travel in two directions, the major central portion of the filmstrip and particularly the emulsion carrying portion does not contact the spool parts as it is bidirectionally translated.

The openings 231 and 232 in the intermediate wall 191 and bottom wall 45, respectively, are slot-like in configuration and of sufficient size to not only permit passage of the filmstrip 35 but to also permit enclosing the filmstrip portion extending between the spools 233 and 230 with a film guide casing 270 to prevent unwanted exposure of the filmstrip from light that might possibly leak into the camera housing and also to guide the film under centrifugal forces.

One example of such a guide casing 270 is shown in FIGS. 17, 17a, 18 guide casing 270 being also shown in FIG. 6 as extending between the supply reel and the lens chamber. As shown in FIGS. 17, 17a, and 18, guide casing 270 includes top and bottom housing portions 255 and 256, each housing portion having an elongated wall 257, 258 provided with spaced sidewall segments 259a and 259b which mount anti-friction rollers 410, 411 respectively in such a manner that when the two housing portions are mated, the sidewall segments 259a and 259b are interleaved in parallel planes and provide essentially unbroken non-light transmitting sidewalls. As shown in FIG. 17, filmstrip 35 follows a serpentine path by passing over one roller 411 and under the adjacent roller 410 when the two housing portions 257 and 258 are mated. Edge margins of filmstrip 35 rollingly engage the enlarged end portions 412 of each of rollers 410, 411 so that the filmstrip 35 will lie in straight lines traversing the space between the enlarged roller end portions.

The portion of the filmstrip 35 which extends between the two bi-directional spool means 260 in FIG. 7 is also encased within a film guide casing means 245 between walls 191 and 198, the film extending through suitably elongated slots 271, 272 and 272a provided in walls 45, 191 and 198. Casing 245 FIGS. 7, 9a and 9b comprises two mating casing portions 246 and 247. Casing portion 247 is provided with sidewall segments 248 for mounting in spaced relation a pair of anti-friction rollers 249 rotatably mounted in segments 248 as at 250. Casing portion 246 includes depending sidewall segments 251 on which are rotatably mounted an anti-friction roller 252 in such a manner that its axis of rotation is spaced from the plane of the axes of rotation of rollers 249. As shown in FIG. 9b, filmstrip 35 passes over one of the rollers 249, beneath the roller 252 and then over roller 249. Each of rollers 249 and 252 includes enlarged end portions so that only edges of the filmstrip are contacted by the rollers and the longitudinal central portion of the filmstrip when under longitudinal tension and under centrifugal forces in operation of the camera lie in substantially straight uncurved transverse lines extending between the enlarged roller end portions. The mating casing portions 246, 247 may be secured by suitable screws in any convenient manner and the film guide casing 245 may also be releasably secured in the position indicated in FIG. 7 to walls 45, 191.

In an exemplary arrangement for directing the path of filmstrip 35 from the lens chamber to the take-up reel 32 as shown in FIG. 7 bi-direction spool means 260 are similar in construction to the bi-directional spools 230 and 233 and are mounted in essentially similar manner. The angular relation of the axes of the spool parts 261 and 262 of each spool are at an angle of approximately 60 degrees in order to translate the direction of the filmstrip between the lens chamber and the film take-up reel 32. Briefly, the top spool means 260 is mounted by a suitable block 263 supported on subplate 50 and by a block 264 supported on wall 45. The shaft of the upper spool part 261 may be suitably connected with a block 265 supported from the circumferential margin portion 46 of the upper housing portion. The lower bi-directional spool 260 is also somewhat similarly supported by suitable block 267 and block 268 from the intermediate wall 198. The lower spool part may be supported from the circumferential wall portion 192.

In the passage of filmstrip 35 through the film guide casing 245 and 270, it will be apparent that the filmstrip is protected against light leakage and the introduction of foreign matter and is positively guided in its passage between the bi-directional spools between the film reel chambers and the lens chamber. The serpentine path of the filmstrip in guide casing 270 involving five rollers and the modified serpentine path in the three roller guide casing 245 provide means for virtually anti-friction free rolling contact of the film edges with the guide rollers under conditions of film tension and centrifugal forces imparted to the filmstrip during such passage when the camera is in operation. The emulsion portion of the film exposed to light during camera operation is not contacted by the rollers as it is guided between the chambers.

The film casing guide 270 is of greater length and is provided with larger diameter rollers than that described with respect to film casing 270, but functions in similar manner. Film guide casing 270 may be fixed to wall 45; film guide casing 245 may be releasably mounted to wall 198.

STATIONARY HOUSING PORTION

Stationary housing portion 22 (FIG. 3b) may comprise a cylindrical wall 290 having the same outside diameter as the cylindrical walls of rotatable housing portion 23. Stationary portion 22 also includes a bottom wall 291 which may be secured to a base member or plate 328 for supporting the camera housing. Stationary portion 22 includes a top partition wall 292 spaced from the top edge 293 of cylindrical walls 290 to provide an upper top open chamber 294 and a generally closed chamber 295 adapted to house the various motor means 124, 209, 220 for driving the camera components in the rotatable housing portion as described hereinabove.

Motor means 300 for the main camera drive means for rotating the rotatable housing portion 23 may be suitably supported in chamber 295 as from the partition wall 292. Motor means 300 is provided with a motor shaft 301 which supports a drive gear 302 for meshed engagement with a gear 303 supported by bearing means 304 carried on wall 292, the outer race 305 thereof being carried by a support member 306 which may be secured to door 196 of the take-up reel chamber. The rotatable housing portion 23 is thus directly driven by motor means 300 through the gears 302 and 303, such driving rotative torque being transmitted through door 196 to upstanding releasable door lock pins 223. A spacer hub 314 extends between door 195 and bottom wall 45 of the upper section 40. Housing sections 40 and 41 which comprise the rotatable camera housing portion 43, may be rotated as a unit at selected speeds by the camera motor means 300.

STABILIZING MEANS

Means for stabilizing rotation of rotatable housing portion 23 and the included camera components therein may comprise the provision of a top annular rib 320 on the exterior of housing section 41 adjacent wall portion 191 thereof. Annular rib 320 provides downwardly and outwardly directed right angle surfaces indicated at 321 for engagement with guide wheels 322 having complementary V-shaped guide faces 323 for engagement with the right angle faces 321. Each guide wheel 322 may be supported about an axis of rotation 324 by an inclined yoke shaped end 325 of an upstanding member 326 having at its lower end a hinged connection at 327 to base plate 328 on which the camera may be mounted. The stabilizing means also includes guide wheels 330 mounted about a horizontal axis of rotation and carried by the upper end portion of an upstanding member 331 having its lower end provided with a hinged connection at 332 to base plate 328. Such stabilizing means may be located at diametrically opposite positions externally of the camera housing assembly and engaged with annular rib 334 provided as an extension of the bottom marginal wall 192 of lower section 41. Such stabilizing wheels 322 and 330 inhibit any movement of the rotatable housing portion 23 off its axis of rotation 24, as well as limiting any vertical displacement of the rotatable housing portion during camera operation. The plurality of spaced support members 326 and 331 and associated guide wheels 322, 330 may be provided and in assembly with the rotatable housing portion 23 may be retained in position by a suitable external cage means or releasable support members (not shown).

It will be readily apparent that when the camera assembly is to be installed or disassembled the cage means may be removed or released, and the members 326 and 331 may be readily released from their vertical positions and hinged slightly away from vertical position as well as removal of the rotatable housing portion to permit ready access to the camera assembly. Stabilizing wheels 330 engage the top horizontal annular face of annular rib 334 to limit upward movement of the housing portion 23. Bearing 304 and spacer 306 maintain coaxial relation of the annular rib 334. Stabilizing wheels 323 engaged with the annular rib 320 limit downward movement of the rotatable portion 23 as well as any twisting or off axis rotation of the rotatable camera housing portion in lateral or horizontal direction. Thus, during camera operation the optical axis of the lens and associated film gate will rotate in a plane with virtually zero deviation therefrom.

OPERATION OF THE CAMERA

Figure 16:
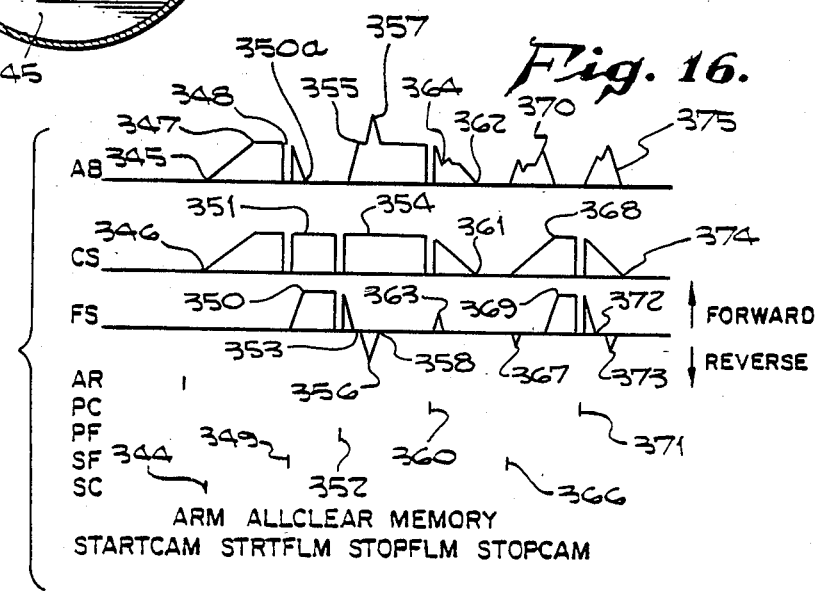
FIG. 16 is a computer printout illustrating operation of the camera.

Operation and control of the panoramic camera 20 is best considered from a viewing of FIGS. 1, 15, and 16. It is contemplated that operation of the camera may be conducted through a control box 350 having suitable necessary circuitry to provide push button operation of the functions of the camera and including a computer program utilizing well-known microprocessing systems. In FIG. 15 the command channels from the control box are schematically illustrated and include a command channel to the main camera motor 300, a separate command channel to the sprocket motor 124 for actuation of the main camera housing rotative drive and also to the main film sprocket drive which would produce rotation of the rotatable housing portion 23, the main film sprocket 37, the drives therefor being described hereinabove. Upon reaching a preselected speed of rotation which would normally be cine speed of 24 frames per second or 1440 rpm of the rotatable camera housing portion 23, a command may be given to the main sprocket brake means 126 which will cause the rotating main film sprocket 37 to stop. The rotatable housing portion 23 continues to rotate with the camera components therewithin such as the lens 30, the film gate, the filmstrip arranged on the various idle spools as shown in FIG. 4, and the film supply reel 31 and film take-up reel 32. Upon stopping the main film sprocket 37 while the remaining camera components continue to rotate about axis 24, the filmstrip momentarily engages in nonrelative movement the sprocket teeth of the main film sprocket 37. Since the column 120 supporting the main film sprocket 37 is now stationary, the coaxial rod 127 is also stopped, and the gear train 132, 133 and pulley belt drive 136 produces rotation of the film supply sprocket 36 because of continuous rotation of the camera housing portion 23. Thus the filmstrip 35 is moved relative to the film gate 70 for exposure of film when the capping shutter 80 is moved by its solenoid into open position. For each revolution of the lens 30, a length of film comprising one scan length will be exposed continuously, the scan length being the circumference of the main film sprocket 37, the relationship of which has been heretofore described. In view of the continuous exposure of the film as compared to intermittent frame by frame exposure of most motion picture cameras, means are provided for identifying one scan length. Such means may comprise a light emitting diode 400 (FIG. 4) at the exit side of the curved film gate path. A light transmitting passage way 401 for the light emitting dialed 400 is arranged in diametrical relation with the film spool 164. The light emitting diode is actuated each time a single revolution of the camera or of the main film sprocket 37 is completed so that a momentary flash of light from the diode will expose a small mark on the edge of the film as it passes passageway 401 and thus precisely indicates and identifies one scan length of the film. Means for actuating the light emitting dialed 400 upon each revolution of the camera is well known and not described herein.

In the start-up operation of the camera as briefly described above, it should be noted that the stationary rod 127 which is secured only at its lowermost end at the brake means 126 provides a torsion rod means which will absorb irregularities in the transfer of rotative forces to the film supply spool 36 through the gear and pulley drive connecting the rod 127 and the shaft of the film supply sprocket 36. Thus, the start-up of relative movement between the filmstrip 35 and the film sprocket 36 provides a smooth change in the speed of the filmstrip.

The film supply reel 31 and film take-up reel 32 are driven in correlation with the film tension as determined by suitable tension sensors and feedback pots (not shown) associated with each of the spring biased slack arms 154 and 169. It will be understood that the film tension is initially adjusted by the relative positioning of the film supply sprocket 36 and main sprocket 37 and by the position of the slack arms 154 and 169. During film movement in operation of the camera, the slack arms 154 and 169 through their associated sensors compensate for variation in tension forces acting on the filmstrip and provide a virtually uniform film tension as previously described.

It should also be noted that in initial preparation of the camera for start-up that the lens means and associated counterweight may be adjusted vertically to compensate for positions of the camera that may be above or below a desired viewpoint. Translation of the lens means vertically permits limited offsetting of the image. Since the lens means is counterbalanced by counterbalancing means 39 as above described, the counterbalance means 39 is also vertically adjusted simultaneously with the lens means to provide counterbalancing in such finally vertically adjusted position.

To assure that the top door 47 is in proper closed position and the shafts are in engagement with shafts 140 and 129, respectively, a sensor means may be, not shown, to assure that the top door 47 is in proper locked position.

In further operation of the camera 20 and with reference to FIG. 16 which represents a computer printout of operation of the camera through selected phases thereof, the following exemplary sequence may take place in one mode of operation. The camera may be armed (AR) by tensioning of the filmstrip by control of the reversible motors associated with the supply and take-up reels. The camera may then be started at a point in time indicated at 344. Indicia 344 is in a vertical plane which includes the beginning of the curve 345 and 346 of the lines identified by (AB) which has reference to the absolute film speed with respect to ground and the line identified by (CS) which has reference to the camera speed. It will be noted that in this vertical plane identified by the indicia 344 the line indicated by (FS) showing the film speed relative to the camera contains no information.

As the camera rotates a period of time elapses to that indicated by 347 which indicates that the rotational speed of the camera has reached a selected speed which is to be maintained. The chart indicates that such speed was maintained for a short period of time the end of which is indicated at 348 and during which the film speed relative to the camera has been zero.

The start film command (FS) is indicated by time indicia 349 and also on the film speed line, the film speed relative to the camera increasing to the point indicated at 350. It will be noted that on the line (AB) showing absolute film speed with respect to ground that that speed has been reduced as indicated at 350a. At this point in time, the camera speed remains uniform as indicated by 351.

When the film is stopped, as indicated by indicia 352 opposite (PF), the film speed relative to the camera is reduced to the point indicated by 353 on the film speed line (FS). The camera speed remains the same as indicated by 354 and the absolute film speed with respect to ground is indicated as increasing as shown on line (AB) at 355. While camera speed is maintained as shown at 354 on line (CS), it will be noted that the relative film speed is reversed as indicated at 356 and the line AB indicates that the absolute film speed with respect to ground has increased as shown at 357.

Under the illustration in FIG. 16, after the film speed has been stopped, the film speed relative to the camera will return to zero as shown at 358. On line CS the camera speed continues at the selected rate and on line AB the absolute film speed continues until the camera is stopped as indicated by indicia 360 on line PC. Upon stopping of the camera, it will be apparent that the camera speed as indicated on line CS drops to zero at 361, the absolute film speed with respect to ground drops to zero as indicated at 362 on line AB, and there is a momentary forward movement of the film speed indicated at 363 on line FS. The momentary film speed at 363 is also represented by the recess 364 shown in line AB.

In a second mode of operation, upon restarting of the camera after stopping at a point of time indicated after 361, the filmstrip is also started as indicated by 366 in a reverse direction for a limited period of time such as five seconds to that five seconds of already exposed film may be used as a leader for the succeeding portion of unexposed film. Thus, as shown in FIG. 16, start-up of the filmstrip in a reverse direction as indicated by the line FS at 367 will then permit the filmstrip to be moved relative to the camera speed so that when the camera speed reaches its selected rotative speed indicated at 368, the film speed will be at 369 and exposure of unexposed film may be commenced immediately after the end of the prior exposed film portion. When the camera is stopped as indicated by indicia 371 on line PC, line FS indicates slowing down of the speed of the filmstrip to zero at 372 and then a reversal of the filmstrip to a time point indicated at 373. As indicated on line CS, the camera speed slows to a stop at the time point reference at 374. Line AB shows the integration of these two relative speeds as indicated at 375 on line AB.

It will thus be apparent that the operation of the camera includes a novel system whereby after stopping the camera, the camera may be again started without loss of film to be exposed while the camera is being brought up to selected rotational speed. The computer controlled camera operation facilitates the complete economical use of unexposed film and the exposure thereof in a camera of this type without intermediate unexposed portions of the film produced by the requirements that the camera be brought up to operational speed before movement of the filmstrip. A blank film leader will prevent the waste of unexposed film at the very beginning of the camera operation; however, it will be apparent that if the camera is stopped in an intermediate section of the unexposed filmstrip that a certain length of leader is required before the camera is again up to the selected speed of rotation and the filmstrip is moving at the proper speed relative to the film gate for exposure. The method contemplated by this invention is that by reversal of the filmstrip after the camera has been stopped a portion of the exposed film may be utilized as a leader so that when the camera and filmstrip reach the desired speeds of rotation the succeeding portion of unexposed film will be in continuous sequence with the previous exposed film. It will be understood, of course, that the capping shutter means 80 will move into closed position immediately upon stopping of the camera and reversing of the filmstrip and will remain closed until the camera and filmstrip are moving at the desired speed for exposure of film.

When the camera comes to a complete stop, the film portion in the exposure chamber will represent the space or gap between exposed portions of the film.

It may pay to point out that when the camera comes to a complete halt the film in the exposure chamber will be the gap between exposures (not the desired exposed film).

While the film supply and film take-up reels 31 and 32 have been illustrated as of a certain diameter relative to the inner diameter of cylindrical wall 190, it will be understood that the diameter of the film reels may be increased to accommodate greater lengths of film. It is also contemplated that since the rotatable housing portion is made in two separable sections 40 and 41 that if desired the film capacity of the camera may be greatly increased by enlargement of the diameter of only the section 41. It will be noted that since the film supply and take-up reels are coaxially arranged that the dynamic balance of the camera as to the movement of the filmstrip remains unchanged.

The system of filmstrip guides and idle spools and bidirectional spools described above facilitates the use in a camera of the present invention of motion picture film of relatively thin film base material, inasmuch as splicing of film rolls together will not produce irregularity in film transport or in the passage of the spliced sections through the film gate. It should be noted that the film spools, film guide means and film gate are so designed that only the longitudinal edge margins of the filmstrip are contacted during transport. Further, since the movement of the filmstrip is continuous and not subjected to an intermittent start-stop action, the wear and possible distortion of the sprocket holes in the film is obviated and the film transport is smooth and not subjected to intermittent movement.

Figure 10:
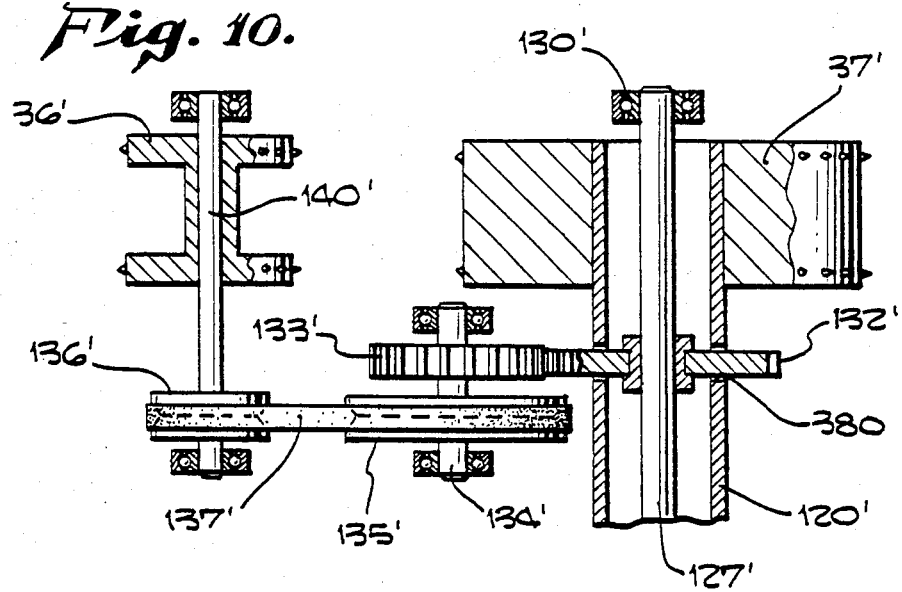
FIG. 10 is a fragmentary schematic sectional view of a different drive means for the film supply sprocket in the film lens chamber.
Figure 11:
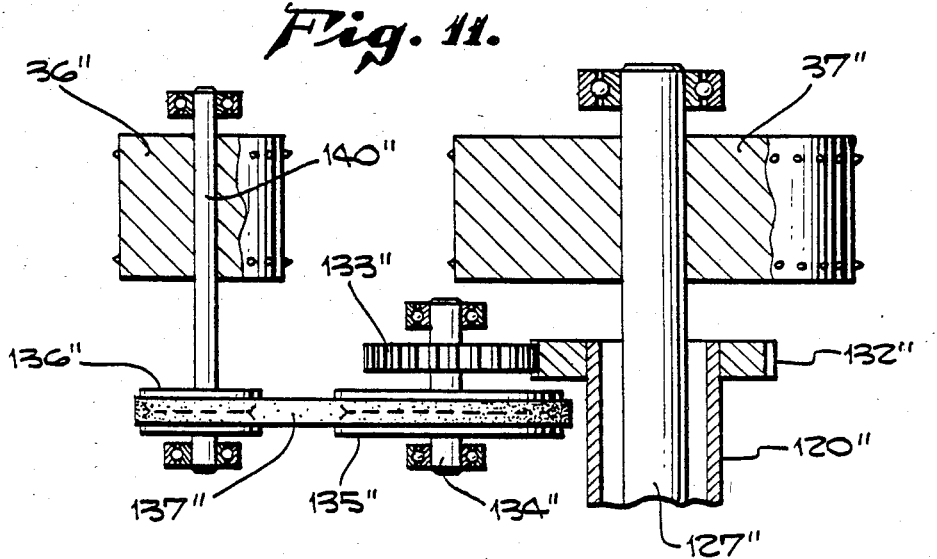
FIG. 11 is a still different exemplary drive means for a film sprocket in the film lens chamber.

In FIGS. 10 and 11, alternate modifications of the drive between the stationary main sprockets and the film supply sprocket are illustrated, like parts being given reference numerals with a prime sign. Briefly, in FIG. 10, column 120' carries main sprocket 37' and is associated with the brake means and with a sprocket motor as described in the prior embodiment. Upstanding rod 127' is provided with a top bearing mounting 130'. In this embodiment, the spider gear 132' may be carried by rod 127' below its top end, the spider elements of the gear extending through suitable openings 380 in the column 120'. Spider gear 132 engages a gear 133' which may be mounted for rotation about a shaft 134'. Below gear 133', shaft 134' carries a drive pulley 135' which carries a belt 137' for engagement with a pulley 136' carried on a shaft 140' which carries film supply sprocket 36'.

In the embodiment of FIG. 10, the driving of the film sprocket 36' is in the same manner as that described in FIG. 3a in the prior embodiment; however, the gear and pulley drive is located below the sprockets 36' and 37' and is not associated with the top door 47. Such modification of the film supply sprocket drive may be useful in certain modifications of the camera means 20.

In FIG. 11, a still further modification of the film sprocket drive is illustrated and will be briefly described, similar parts being given double prime reference numerals. As shown in FIG. 11, the main film sprocket 37" is now carried by upstanding rod 127' which may be connected to the column 120" in the same manner as shown in FIG. 3b and in the first embodiment of the invention, since both column 120" and rod 127" are fixed and rotate and stop together. In this embodiment, column 120' is provided with a gear 132" for engagement with a gear 133" carried on a shaft 134" which supports a pulley 135". Pulley belt 137" engages a pulley 136" carried by shaft 140" which carries the film supply sprocket 36". It will be apparent that this gear and pulley drive arrangement of the film supply sprocket 36" differs from the other embodiments of such drive in that the main film sprocket 37' is carried by rod 127" and that the gear 132" is connected to the column 120".

The panoramic camera means described above is compact in size, the diameter of the camera housing being in the order of 16" or less. Such compactness facilitates use of the camera in underwater photography and wherein an external underwater casing may enclose camera 20. The underwater casing may be internally provided with the stabilizing wheels for engagement with the annular ribs on housing sections 40, 41.

The use in the filmstrip path of film idler spool 164 at the left of the film gate 70 as viewed in FIG. 4 permits the location of the film gate at any radius greater than the radius of the main sprocket 37 and also permits the film gate to be of any shape and size. Thus the outer diameter of the rotatable housing portion may be varied to satisfy other design parameters.

It should also be noted that the film tensioning means is provided by the film supply and take-up motors which are located in the stationary housing portion 22 and are isolated from the rotatable housing portion. No mechanical differential is required between the motors and the rotating film reels. Each motor is separately servo controlled to vary the torque applied to the film reels. This arrangement reduces the spinning weight of the camera and the horsepower required of the camera motor.

It should also be noted that the entire arrangement of rotatable camera components within the rotatable housing portion provides a distribution of mass which is substantially balanced.

It will be readily apparent that various modifications and changes may be made in the camera described above and which come within the spirit of this invention and all such changes and modifications coming within the scope of the appended claims are embraced thereby.

We claim:

1. In a panoramic motion picture camera adapted to continuously expose a filmstrip, comprising in combination:
   a camera body assembly including a stationary housing portion and a rotatable housing portion providing an axis of rotation;
   a lens means within said rotatable portion and rotatable about said axis in a planar zone normal to said axis;
   a film supply reel and a film take-up reel within said rotatable portion, each reel being rotatable about said axis in coaxial relation and each reel being in a respective planar zone normal to said axis;
   a main film sprocket in said rotatable portion provided on said axis and in said planar zone of the lens means;
   a rotatable film sprocket radially spaced from said main sprocket;
   a film gate between said lens means and said axis;
   guide means within said rotatable housing portion for said filmstrip to provide a filmstrip path from the planar zone of said supply reel to the planar zone of said main and film sprockets and then to the planar zone of said film take-up reel;
   and drive means carried by said camera body assembly for rotating said rotatable portion, said lens means, and said film reels about said axis in their respective planar zones.

2. A camera as stated in claim 1, including
   counterbalance means diametrically opposite said lens means,
   and means for carrying said lens means and counterbalance means.

3. A camera as stated in claim 2, including means for adjustment of said counterbalance means and said lens means in the direction of said axis.

4. A camera as stated in claim 1, wherein
   said film gate includes a slit aperture on the optical axis of said lens;
   said film gate providing a curved surface for guiding said filmstrip past said slit aperture in a plane virtually normal to said optical axis when said filmstrip is subjected to centrifugal forces due to rotation of the rotatable housing portion.

5. A camera as stated in claim 4 wherein
   said curved surface for guiding said filmstrip past said slit aperture is convexly curved with respect to said lens.

6. A camera as stated in claim 1, wherein
   said guide means includes filmstrip idler spools,
   and pivoted slack arms for mounting certain of said spools for control of filmstrip tension during rotation of said lens and film reels.

7. A camera as stated in claim 1, wherein said filmstrip guide means includes
   a film guide spool means adjacent the circumference of said film reels and comprising a pair of spool parts having respective axes thereof disposed at a selected angle for changing the direction of the filmstrip in two directions.

8. A camera as stated in claim 9 wherein
   each spool part comprises an annular flange,
   a conical spool portion generally tapering toward the end of the portion distal from said flange, each spool portion having an axis,
   and means for mounting said spool parts with their axes in selected angular relation.

9. A camera as claimed in claim 8 wherein
   each conical spool portion is adapted to contact longitudinal edge margins of said film strip only.

10. A camera as stated in claim 1, wherein said drive means for rotating said lens means about said axis includes
    a drive motor mounted in said stationary housing portion of said camera body assembly;
    and gear means between said stationary and rotatable housing portions driven by said motor means for rotating said rotatable housing portion and said lens means supported therein.

11. A camera as stated in claim 1, wherein said camera body assembly includes a hollow column supported from said stationary housing portion and coaxial with said axis;
    said hollow column supporting said main film sprocket;
    and brake means in said stationary housing portion for permitting, in brake release condition said hollow column to initially rotate while said rotatable housing portion is brought up to a selected speed and then, in brake applied condition to stop rotation of said column and main film sprocket to expose film.

12. A camera as stated in claim 1, wherein said drive means for said film reels include
    a reversible motor for each film reel supported in said stationary housing portion and adapted to drive said film reels at selected rotative speeds relative to the speed of rotation of said lens means and rotatable housing portion.

13. A camera as stated in claim 1, wherein said drive means is adapted to rotate said rotatable portion and lens means about said axis at speeds in the order of about 1440 revolutions per minute
    and counterweight means for camera components in said rotatable housing portion.

14. In a camera as stated in claim 1, including
    capping shutter means at said film gate normally biased to closed position;
    and means to actuate said shutter means to open position to expose film.

15. A camera means as stated in claim 1, including
    stabilizing means cooperable with said rotatable housing portion externally thereof for maintaining said rotatable portion in its planar zone.

16. A camera as stated in claim 1 including
    means for locating the film gate a selected radial distance from said main sprocket and including a film idler spool located in the film path adjacent to and after the filmstrip passes the film gate.

17. A camera as stated in claim 16 including
    means for marking each scan length at said film idler spool located adjacent the film gate.

18. In a camera as stated in claim 1:
    a film guide roller spaced upstream from said gate means;

and means supporting said guide roller whereby said filmstrip, responsive to centrifugal forces acting on such filmstrip, enters said gate means in a curved path.

19. In a camera as stated in claim 1 including
means for guiding a filmstrip past said gate means including a path curved convexly with respect to said lens means whereby centrifugal forces acting on film portions passing said gate means flatten said film portions at said gate means.

20. A camera as stated in claim 1 wherein
said drive means for rotating said film reels include a drive tube for each reel coaxial with said axis,
each film reel having a hub with bore receiving an end portion of its associated drive tube,
said end portion of each of said drive tubes having a longitudinally extending slot;
and a biased pin carried by each reel hub for driving engagement with said slot in the drive tube.

21. A camera as stated in claim 20 wherein
a plurality of longitudinally extending slots are provided on each drive tube for facilitating driving engagement of said biased pin with one of said slots on the drive tube.

22. A camera as stated in claim 20 wherein
a drive tube provided with an upper end having longitudinally extending slots is provided for each of said supply and take-up reels,
each of said reels having a spring biased pin for reception in one of said slots in its associated drive tube.

23. In a panoramic motion picture camera adapted to continuously and nonintermittently expose a filmstrip, comprising in combination:
a generally cylindrical camera body means including a stationary base housing portion and a rotatable housing portion comprising upper and lower housing sections thereabove providing an axis of rotation;
a camera lens mounted in said rotatable upper housing section adjacent the circumference of the cylindrical body means;
film supply and take-up reels within said rotatable lower housing section and arranged in coaxial spaced relation with respect to said axis;
gate means providing a slit aperture on the optical axis of said lens and between said lens and said axis of rotation;
guide means for said filmstrip to provide a filmstrip path within the upper housing section and to guide said filmstrip between said upper and lower housing sections;
means for mounting a main normally stationary film sprocket on said axis of rotation in the planar zone of rotation of said lens;
means for mounting a film supply sprocket in spaced relation to said main sprocket;
and means mounted in the stationary housing portion for driving said film supply and take-up reels, said film supply sprocket and said lens at selected speeds of rotation.

24. A camera as stated in claim 23 wherein said
means for mounting said main film sprocket includes a rotatable column disposed on said axis of rotation and extending into said stationary housing portion,
said column adapted to be initially rotatable with said rotatable housing portion during start up of said camera;
and brake means in said stationary housing portion connected with said column to cause nonrotation of said column and said main film sprocket to provide relative movement between said filmstrip and said film gate.

25. A camera as stated in claim 24, wherein
said column includes an internal rod connected therewith adjacent the brake means;
and drive means extending between said internal rod and said film supply sprocket for driving said film supply sprocket relative to the main sprocket when said sprocket is stationary.

26. A camera as stated in claim 23 including
stabilizing means for said upper and lower housing sections and comprising
external annular ribs on each section,
and means engageable with said annular ribs for restraining said sections against axial and lateral displacement.

27. A camera as stated in claim 26 wherein said engageable means includes
a plurality of circumferentially spaced stabilizing wheels and members supporting said wheels,
and means carrying said members externally of the housing sections.

28. A camera as stated in claim 23 wherein
said driving means for the supply and take-up reels include servo control means for tensioning the filmstrip, said reel driving means being isolated from the rotatable housing portion.

29. A camera as claimed in claim 23 wherein said rotatable housing portion includes
an elongated housing means having a film inlet opening and a film outlet opening;
said guide housing means including housing parts, each housing part having an elongated wall provided with spaced side wall segments;
and anti-friction roller rotatably mounted in transversely aligned side wall segments;
each housing part beint adapted to mate with the other housing part to provide a serpentine path for a film strip passing over and under said rollers and through said housing means.

30. A camera as claimed in claim 29 wherein
each anti-friction roller includes an annular enlargement adjacent each end for contact with edge margins of a film strip.

* * * * *